(12) United States Patent
Angelskår et al.

(10) Patent No.: US 11,240,607 B2
(45) Date of Patent: Feb. 1, 2022

(54) OPTICAL MICROPHONE ASSEMBLY

(71) Applicant: SINTEF TTO AS, Trondheim (NO)

(72) Inventors: Hallvard Angelskår, Oslo (NO); Thor Bakke, Lysaker (NO); Ib-Rune Johansen, Oslo (NO); Matthieu Lacolle, Nesøya (NO); Jakob Vennerød, Oslo (NO); Andreas Vogl, Oslo (NO); Dag Wang, Oslo (NO)

(73) Assignee: SINTEF TTO AS, Trondheim (NO)

( * ) Notice: Subject to any disclaimer, the term of this patent is extended or adjusted under 35 U.S.C. 154(b) by 0 days.

(21) Appl. No.: 17/054,981

(22) PCT Filed: May 15, 2019

(86) PCT No.: PCT/GB2019/051323
§ 371 (c)(1),
(2) Date: Nov. 12, 2020

(87) PCT Pub. No.: WO2019/220103
PCT Pub. Date: Nov. 21, 2019

(65) Prior Publication Data
US 2021/0274291 A1 Sep. 2, 2021

(30) Foreign Application Priority Data
May 15, 2018 (GB) ..................................... 1807889

(51) Int. Cl.
*H04R 23/00* (2006.01)
*G01B 9/02* (2006.01)

(52) U.S. Cl.
CPC ....... *H04R 23/008* (2013.01); *G01B 9/02051* (2013.01); *H04R 2201/003* (2013.01)

(58) Field of Classification Search
CPC ............ H04R 23/008; H04R 2201/003; G01B 9/02051
See application file for complete search history.

(56) References Cited

U.S. PATENT DOCUMENTS

| 2002/0039463 A1 | 4/2002 | Degertekin et al. |
| 2004/0130728 A1 | 7/2004 | Degertekin et al. |

(Continued)

FOREIGN PATENT DOCUMENTS

| GB | 1267632 A | 3/1972 |
| WO | 2010029509 A1 | 3/2010 |

(Continued)

OTHER PUBLICATIONS

Notification of Transmittal of the International Search Report and the Written Opinion (Form PCT/ISA/220), International Search Report (Form PCT/ISA/210), and Written Opinion (Form PCT/ISA/237) for International Application No. PCT/GB2019/051323 dated Jul. 4, 2019, 15 pages.

(Continued)

*Primary Examiner* — Mark Fischer
(74) *Attorney, Agent, or Firm* — Withrow & Terranova, P.L.L.C.; Vincent K. Gustafson

(57) ABSTRACT

An optical microphone assembly comprises a rigid substrate; an interferometric arrangement, a light source, at least one photo detector and an enclosure. The interferometric arrangement comprises a membrane and at least one optical element spaced from the membrane, wherein the at least one optical element comprises a surface of the substrate and/or is disposed on a surface of the substrate. The light source is arranged to provide light to the interferometric arrangement such that a first portion of the light propagates along a first optical path via the interferometric arrangement and a second portion of the light propagates along a second different optical path via the interferometric arrangement, thereby giving rise to an optical path difference between the first and second optical paths which depends on a distance between the membrane and the optical element. The photo detector(s) are arranged to detect at least part of an interference pattern (Continued)

generated by said first and second portions of light dependent on said optical path difference. The enclosure is arranged to form an acoustic cavity in fluid communication with one side of the membrane. The volume of the acoustic cavity is at least 3 mm multiplied by $d^2$, where d is a diameter of the membrane.

21 Claims, 18 Drawing Sheets

(56) References Cited

U.S. PATENT DOCUMENTS

| | | |
|---|---|---|
| 2005/0018541 A1 | 1/2005 | Johansen et al. |
| 2005/0105098 A1 | 5/2005 | Johansen et al. |
| 2006/0192976 A1 | 8/2006 | Hall et al. |
| 2011/0194711 A1 | 8/2011 | Avenson et al. |
| 2016/0138906 A1* | 5/2016 | Lacolle .......... H04R 23/008 356/614 |
| 2016/0219375 A1 | 7/2016 | Hall et al. |
| 2018/0075867 A1 | 3/2018 | Dahl et al. |

FOREIGN PATENT DOCUMENTS

| | | |
|---|---|---|
| WO | 2011115933 A2 | 9/2011 |
| WO | 2014202753 A1 | 12/2014 |

OTHER PUBLICATIONS

Search Report under Section 17(5) for United Kingdom Patent Application No. GB1807889.9 dated Nov. 13, 2018, 3 pages.
Kim, Donghwan et al., "Towards a sub 15-dBA optical micromachined microphone," J. Acoust. Soc. Am. 135(5), pp. 2664-2673, May 2014, Acoustical Society of America, 10 pages.

* cited by examiner

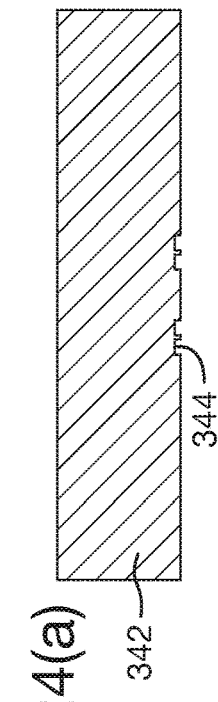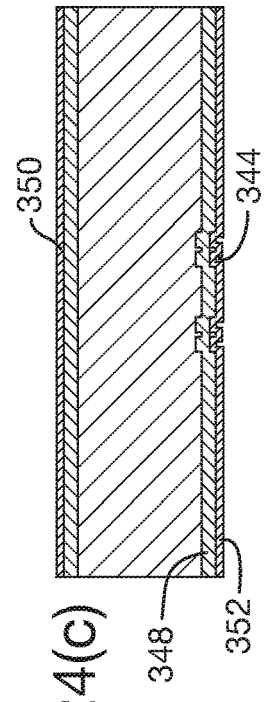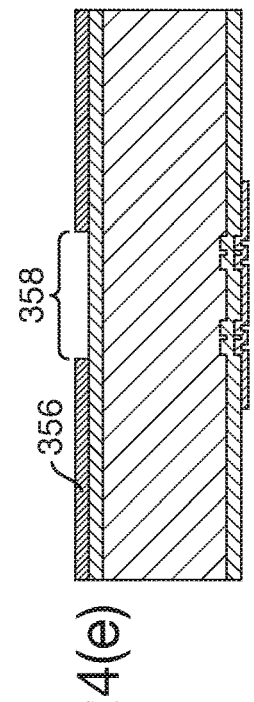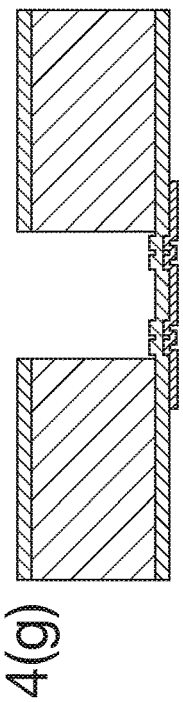
Fig. 24(a)   Fig. 24(c)   Fig. 24(e)   Fig. 24(g)
Fig. 24(b)   Fig. 24(d)   Fig. 24(f)   Fig. 24(h)

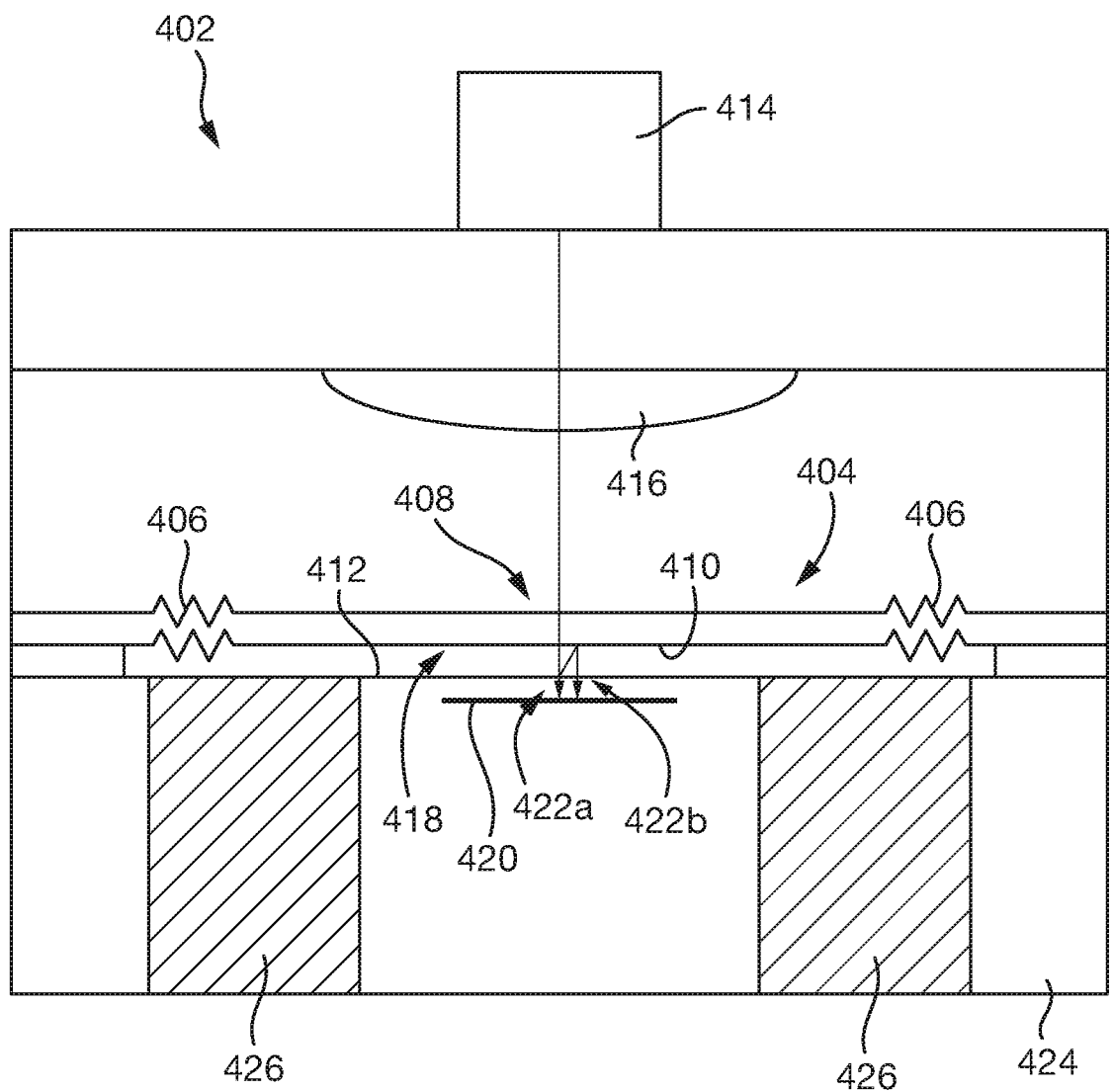

OPTICAL MICROPHONE ASSEMBLY

This application is a 35 U.S.C. § 371 national phase filing of International Application No. PCT/GB2019/051323 filed on May 15, 2019, and claims the benefit of United Kingdom Patent Application No. 1807889.9 filed on May 15, 2018, wherein the disclosures of the foregoing applications are hereby incorporated by reference herein in their respective entireties.

This invention relates generally to optical microphone assemblies, and in particular to acoustic structures for housing optical microphones.

Microphones are used to convert sound waves into electrical signals, typically by measuring the displacement of a moveable member (e.g. a membrane) that vibrates in response to ambient acoustic vibrations. There are a number of ways of measuring the displacement of such a moveable member. One common way is to use capacitive readout, which involves measuring the capacitance between the moveable member, e.g. a membrane, and a back electrode. A microphone that operates in this way is commonly called a condenser microphone. Other types of microphone use readout mechanisms based on electrostatic or electromagnetic effects, e.g. dynamic microphones.

It is desirable for a microphone to have a high signal-to-noise ratio (SNR) and high sensitivity. To achieve this, the compliance of the microphone membrane should be as high as possible. As used herein, compliance refers to the displacement of a membrane produced by a given pressure, and is given in units of nm/Pa. Accordingly, a higher compliance membrane exhibits a greater displacement in response to a given pressure, which means that for a given volume of sound, a greater displacement is produced. Consequently, a microphone constructed with a membrane of higher compliance is more sensitive.

However, typically, the compliance of a microphone membrane will be limited by practical aspects related to its maximal motion. For example, in a condenser or capacitive microphone, the distance between the membrane and the back electrode must be small (e.g. a few microns in a MEMS capacitive microphone). If the distance is too large, the capacitance between the membrane and back electrode will become too small and electric readout noise will degrade the sensitivity of the microphone. This limits the maximum displacement permitted for the membrane, and thus limits the membrane compliance.

An alternative way of reading out the position of a microphone membrane is optical interferometric readout. U.S. Pat. Nos. 7,116,430 and 7,184,368 describe systems for implementing optical interferometric readout. In the disclosed systems, a diffraction grating is provided adjacent to a membrane, and electromagnetic radiation is directed onto the diffraction grating. A first portion of the light is reflected back from the grating. A second portion is transmitted through the grating, which diffracts the radiation. The diffracted radiation impinges on the membrane, which reflects it onto the grating. The radiation passes through the grating and the two portions of light interfere to create an interference pattern that can be detected by the detector. The interference pattern has a shape (i.e. spatial distribution) matching the diffraction orders of the grating, but the light intensity directed into these diffraction orders depends on the relative phase of the two portions of light, and therefore on the distance between the grating and the membrane. The position (and therefore the movement) of the membrane can thus be determined from changes in the intensity of the light at the detector.

U.S. Pat. No. 7,116,430 also describes a method of using electrostatic actuation to adjust the equilibrium position of the membrane to increase the dynamic range of the microphone. EP 14732548 describes an interferometric readout method that provides an increased dynamic range. More than one diffraction grating is provided, where the diffraction gratings have different phase offsets relative to the microphone membrane. The different phase offsets are provided, for example, by positioning the gratings with different height offsets relative to the membrane, although this can also be achieved in other ways, for example by using optical delay films. This results in multiple optical signals with relative phase offsets. Combining the signals to provide an optical measurement extends the operation range of the microphone.

Optical readout does not rely on a capacitance between the membrane and a back electrode, and so it is not necessary to restrict the maximum displacement of the membrane (and thus its compliance) in the manner described above. Further, optical readout avoids the risk of potentially permanent damage caused by "stiction". Stiction occurs in capacitive microphones when the membrane is displaced too far towards the back electrode. As the membrane must be charged to form a capacitance, excessive travel of the membrane towards the back electrode would cause the membrane to collapse by becoming unstably attracted to the back electrode until contact, which will impair the functioning of the microphone and potentially cause permanent damage. In optical microphones, the membrane does not need to be charged, and so stiction is much less likely to occur.

For the reasons given above, optical readout allows for a greater maximum displacement of the membrane, thus allowing higher compliance membranes to be used.

However, the compliance of an optical microphone membrane is not entirely unrestricted and other factors, in particular relating to the housing of the microphone, impose other restrictions on the membrane compliance and/or degrade the performance of the microphone, even when a high compliance membrane can be used. The Applicant has therefore appreciated the desirability of an improved optical microphone with an improved acoustic housing structure to allow greater microphone sensitivity to be achieved for an optical microphone, especially for high compliance membranes.

When viewed from a first aspect the invention provides an optical microphone assembly comprising:
  a rigid substrate;
  an interferometric arrangement, the interferometric arrangement comprising a membrane and at least one optical element spaced from the membrane, wherein the at least one optical element comprises a surface of the substrate and/or is disposed on a surface of the substrate, the optical microphone assembly further comprising:
  a light source arranged to provide light to said interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the optical element; and at least one photo detector arranged to detect at least part of an interference pattern generated by said first and second portions of light dependent on said optical path difference;

an enclosure arranged to form an acoustic cavity in fluid communication with one side of the membrane; wherein the volume of the acoustic cavity is at least 3 mm multiplied by $d^2$, where d is a diameter of the membrane.

The invention extends to a method of operating an optical microphone assembly, the optical microphone assembly comprising:

a rigid substrate;

an interferometric arrangement, the interferometric arrangement comprising a membrane and at least one optical element spaced from the membrane, wherein the at least one optical element comprises a surface of the substrate and/or is disposed on a surface of the substrate;

a light source;

at least one photo detector; and an enclosure arranged to form an acoustic cavity in fluid communication with one side of the membrane; wherein the volume of the acoustic cavity is at least 3 mm multiplied by $d^2$, where d is a diameter of the membrane; the method comprising:

the light source providing light to said interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the optical element; and the photo detector(s) detecting at least part of an interference pattern generated by said first and second portions of light dependent on said optical path difference.

Thus it can be seen that in accordance with the invention, the optical element forming part of the interferometric arrangement comprises or is disposed on the surface of the substrate which is rigid, in contrast with comparatively flexible structures used in the prior art. For example, the microphone of U.S. Pat. No. 7,116,430 uses a diffraction grating formed in a thin suspended structure. By forming the optical element on a surface of a rigid substrate, vibrations (for example, from an acoustic wave or from ambient acoustic noise) in the substrate are significantly reduced. This significantly reduces the impact of noisy vibrations which would otherwise degrade the microphone assembly sensitivity and prevent the benefit of a high compliance membrane being obtained. In addition, without the benefit of the present invention, an incoming acoustic wave that makes the membrane vibrate could also cause the substrate to move, e.g. due to a change in pressure in the volume between the membrane and the substrate. This would also prevent the benefit of a high compliance membrane being obtained. The rigid substrate in accordance with the present invention ameliorates such pressure effects.

When it is said that the substrate is rigid, it is to be understood that this means that the substrate does not undergo significant movement, e.g. vibration, in response to a force or pressure such as an incoming acoustic wave. The substrate may have a compliance that is lower than the compliance of the membrane, e.g. ten times lower, 20 times lower, or 50 times lower. In this context, it is to be understood that "compliance" has an equivalent meaning to that defined above in respect of a membrane, i.e. the substrate compliance refers to the displacement of a surface of the substrate produced by a given pressure, and is given in units of nm/Pa.

The rigid substrate may be rigid by virtue of being thick. In preferred embodiments, the substrate has a thickness of at least 10 micrometres. In some embodiments, even greater sensitivity may be achieved by providing a thicker substrate. Thus, in a set of embodiments, the thickness of the substrate is at least 50 micrometres, more preferably at least 200 micrometres.

It can also be seen that according to the invention, a minimum volume of the acoustic cavity is defined in terms of the diameter d of the membrane. This, when coupled with the rigid substrate discussed above, is advantageous for the reasons discussed below.

Microphones in accordance with the present invention are implemented with a membrane that is deflected by the pressure difference between the two sides of the membrane, which results from the pressure of an incoming acoustic wave. The Applicant has recognised that to accurately determine the pressure of the incoming acoustic wave from the membrane deflection, the pressure on the other side of the membrane from the incoming wave should be kept constant, or as close to constant as possible.

In the prior art, typically an acoustic cavity enclosing a volume of air is provided underneath the membrane on a chip. This prevents the incoming acoustic wave impinging on both sides of the membrane (which would cancel out any pressure difference). However, when the membrane is deflected by the incoming wave, the air in the cavity is compressed. The compression of the air results in a pressure increase in the cavity, effectively pushing back against the membrane deflection. This creates an effect equivalent to a stiffening of the membrane, especially at larger deflections (when the compression is greatest). For low compliance membranes, the deflection is relatively small, and so this additional stiffening effect is not significant. However, for high compliance membranes, the greater maximum deflection of the membrane means that the additional stiffening of the membrane becomes significant. This effectively reduces the membrane compliance, as the membrane is prevented from vibrating to its maximum extent due to the increase in air pressure in the cavity.

The Applicant has appreciated that by selecting an acoustic cavity volume that takes into account the maximum deflection of the membrane (which is roughly proportional to the diameter square, $d^2$), with an additional factor of 3 mm (to account for the membrane compliance at which the above-mentioned effective stiffening begins to have a significant effect), a volume can be selected that is large enough that the compression of air caused by the membrane deflection does not cause significant stiffening of the membrane. The use of an enclosure advantageously allows a large acoustic cavity. This is in contrast with, for example, prior art microphones in which a microphone chip is mounted on a PCB, and an acoustic cavity is provided in the form of a hollow space under the microphone chip. In such arrangements, the acoustic cavity size is limited by the size of the microphone chip (which may typically be around 1 mm×1 mm). The signal-to-noise ratio (SNR) of such microphones is typically limited to around 63 dB.

The optical microphone assembly preferably comprises a microelectromechanical system (MEMS) optical microphone, wherein at least the interferometric arrangement, and preferably the light source and the photo detector together define the MEMS optical microphone. The meaning of the term micro-electromechanical system (MEMS) is well understood by a person skilled in the art, so it will be understood that when it is said that the optical microphone is a "MEMS optical microphone", this means that the optical microphone comprises miniaturized mechanical and/or electro-mechanical elements (i.e. devices and structures, e.g. the interferometric arrangement), for example, which may have been made using microfabrication techniques, where miniaturized means that the physical dimensions of the miniaturized elements are on the scale of micrometres, e.g. the physical dimensions may be up to a millimetre or shorter, although "MEMS" is understood to encompass dimensions of a few millimetres, e.g. up to 5 mm or up to 10 mm. Thus it will be appreciated that the volume of the acoustic cavity, i.e. at least 3 mm multiplied by $d^2$, where d is a diameter of the membrane, will typically be large compared with the size of the MEMS optical microphone. The enclosure may be a non-MEMS enclosure, e.g. manufactured using techniques other than MEMS techniques. The interferometric arrangement may be a MEMS interferometric arrangement.

The membrane and the optical element may be integrated into a MEMS component, e.g. such that the membrane and the optical element are part of a single structure (e.g. a composite structure) that is a MEMS component within the understood meaning of MEMS as set out above.

In a set of embodiments, the volume of the acoustic cavity is at least 7 mm multiplied by $d^2$. It may also be advantageous to select the cavity volume based directly on a value of the membrane compliance. Accordingly, in a set of embodiments, a ratio of the volume of the acoustic cavity to the membrane compliance is at least 10 mm$^3$:100 nm/Pa. In a set of embodiments, the volume of the acoustic cavity is at least two times $d^3$, where d is a diameter of the membrane.

Thus it will be appreciated that by combining a rigid substrate with a relatively large acoustic cavity volume, greater microphone sensitivity and SNR can be obtained, especially for a membrane having high compliance. Without either one of these features, the sensitivity and SNR are degraded, either by membrane stiffening leading to a low effective compliance, or due to vibrational noise. The Applicant has appreciated that providing these features in combination, greater benefit can be obtained from using a high compliance membrane (although it will be appreciated that the benefits of the invention may still be seen for lower compliance membranes, albeit to a lesser extent).

In a set of embodiments, the optical microphone assembly comprises one or more apertures providing a passage for air through the substrate. When it is said that the aperture(s) are "through" the substrate, this is not limited to aperture(s) extending completely through the substrate from a front surface to an opposing back surface, although this possibility is included. "Through" should be understood to mean that the aperture(s) are formed in the substrate to allow passage of air at least partly therethrough, but the aperture(s) can extend in any direction, e.g. from a front surface to a back surface, from a front or back surface to an edge surface, or in other directions.

In addition to the acoustic cavity, the optical microphone assembly may comprise an interstitial volume, wherein the substrate and membrane together define the interstitial volume therebetween. Thus it is to be understood that the acoustic cavity does not consist solely of the interstitial volume between the membrane and optical element of the substrate. The interstitial volume may be substantially smaller than the acoustic cavity, for example, less than 10% of the volume of the acoustic cavity, or less than 5% of the volume of the acoustic cavity, or less than 1% of the volume of the acoustic cavity.

In a set of embodiments, the substrate and the membrane together define an interstitial volume therebetween, and the optical microphone assembly further comprises one or more apertures providing a passage for air so that the interstitial volume is in fluid communication with the exterior of the microphone assembly via the apertures.

In another set of embodiments, the substrate and the membrane together define an interstitial volume therebetween, and the optical microphone assembly further comprises one or more apertures providing a passage for air so that the acoustic cavity is in fluid communication with the interstitial volume via the apertures.

It will be appreciated that the one or more apertures connecting the interstitial volume with either the microphone assembly exterior or the acoustic cavity may be formed in the substrate, but it/they may additionally or alternatively be formed in another part of the microphone assembly. For example, it/they may be formed in a spacer portion, an assembly base portion on which the substrate is mounted, in a readout module which houses the light source and/or detector, and/or in other parts of the microphone assembly.

When it is said that the aperture(s) provide a passage for air, this means that air can flow sufficiently freely through the aperture to create substantially instantaneous pressure equalization between the volumes of air fluidly connected by the aperture(s). For example, where the aperture(s) connect(s) the interstitial volume to the acoustic cavity, the interstitial volume and the acoustic cavity thereby effectively act as a single volume having a single instantaneous pressure. Where the aperture(s) provide a passage for air between the interstitial volume and the microphone assembly exterior, this means that an acoustic wave can propagate through the aperture(s) to the membrane so that the acoustic wave can be detected via displacement of the membrane by the acoustic wave pressure.

It will therefore be appreciated that the aperture(s) mentioned above is/are different from vent holes provided to allow static equalization of pressure between the acoustic cavity and the microphone assembly exterior (for example, to allow the microphone to function in an environment of high or low pressure), although such a vent hole may be provided.

In a set of embodiments, the optical microphone assembly comprises a plurality of apertures surrounding a central support portion of the substrate, the optical element(s) being providing on the central support portion.

The Applicant has found that using apertures to provide a passage for air can affect the frequency response of the microphone. For example, resonances or an increased effective membrane mass may be apparent in the microphone frequency response. However, the Applicant has also appreciated that the frequency response can advantageously be influenced by changing the dimensions of the apertures. For example, the aperture(s) may result in a resonance peak in the frequency response of the microphone. The Applicant has found that increasing the size of the aperture (e.g. the width in the plane of the substrate) can increase the central frequency of the resonance peak such that it is outside of the frequency range of interest, e.g. so that it is above 20 kHz, roughly the upper limit of human hearing. In particular, the Applicant has found that in some embodiments a length (i.e. the maximum extent in the plane of the substrate or in the plane of the surface in which the aperture is formed) of several hundred micrometres, e.g. 200 micrometres, provides a suitable frequency response. In a set of embodiments, the or each aperture has a maximum extent in a plane of the substrate, or in a plane of a surface in which the or each aperture is formed, of at least 0.2 mm. In other embodiments, the maximum lateral extent of the or each aperture may have other values, e.g. at least 50 micrometres, at least 100 micrometres, or at least 300 micrometres.

The Applicant has appreciated that the minimum value of the maximum lateral extent to obtain a suitable or preferred frequency response may depend on the thickness of the substrate. Specifically, a thicker substrate may benefit from a larger value of the maximum lateral extent of the aperture(s). In a set of embodiments, the or each aperture has a maximum extent in a plane of the substrate greater than or equal to a thickness of the substrate. Other values are also possible, e.g. the or each aperture may have a maximum extent in a plane of the substrate greater than or equal to half a thickness of the substrate, or greater than or equal to double a thickness of the substrate.

In a set of embodiments the aperture(s) may be provided through other structures or layers in addition to the substrate so as to form composite air channels extending through the substrate and the layers, e.g. if the substrate is mounted on a spacer, the apertures may extend through the spacer and the substrate. In such cases the size of the aperture may be larger to account for the extra length of the composite air channel. In a set of embodiments, the or each aperture has a maximum extent in a plane of the substrate greater than or equal to half a total length of the or each aperture, preferably greater than or equal to a total length of the or each aperture. It will be understood that length means the extent of the aperture(s) through the substrate and any other structures through which the aperture(s) are formed, e.g. in a direction perpendicular to a plane of the substrate.

It will be appreciated that the optimum aperture size may depend on the particular parameters of the optical microphone assembly. Generally, for any embodiment, the maximum extent of the or each aperture in a plane of the substrate may be selected so as to give a frequency distortion of less than 10 dB (preferably less than 5 dB) at frequencies below 15 kHz (preferably below 20 kHz). As used here, frequency distortion means a difference between the measured frequency response and a flat frequency response.

In a set of embodiments, the optical microphone assembly comprises a through-hole in the substrate, the through-hole having substantially similar dimensions to the membrane and substantially overlapping the membrane, and further comprising a plurality of integrally formed radially extending support elements connecting a central support to the substrate around a perimeter of the through-hole, the optical element(s) being provided on the central support. The Applicant has found such embodiments to be particularly advantageous, as they allow sufficient overlap of the through-hole with the membrane for air flow to the membrane, while maintaining sufficient rigidity of the substrate and integrally formed support elements to avoid degradation of the microphone sensitivity due to vibrations and the pressure effects discussed above.

In a set of embodiments, the substrate and the membrane together define an interstitial volume therebetween, and the through-hole provides a passage for air so that the interstitial volume is in fluid communication with the exterior of the microphone assembly via the through-hole.

In a set of embodiments, the substrate and the membrane together define an interstitial volume therebetween, and the through-hole provides a passage for air so that the acoustic cavity is in fluid communication with the interstitial volume via the through-hole.

In embodiments in which the aperture(s) or through-hole provide a passage for air between the interstitial volume and the exterior of the microphone, the enclosure may be positioned to form the acoustic cavity on a side of the membrane facing away from the substrate.

In embodiments in which the aperture(s) or through-hole provide a passage for air between the interstitial volume and the acoustic cavity, the enclosure may be positioned to form the acoustic cavity on a side of the membrane facing towards the substrate.

In a set of embodiments, the area of the membrane overlapping with the apertures or the through-hole is at least 60%, preferably at least 80%. Providing a large area of overlap is advantageous in that it helps to reduce the acoustic impedance of the air mass in the aperture(s)/through-hole, helping to reduce or eliminate undesirable artefacts such as resonances in the microphone frequency response.

In preferred embodiments, the membrane compliance is at least 50 nm/Pa, preferably at least 100 nm/Pa. As discussed above, a high membrane compliance potentially allows greater microphone sensitivity and higher SNR, because the membrane can undergo greater deflections in response to an acoustic wave. Embodiments of the present invention allow the benefit of this greater compliance to be realised by ameliorating the effects of vibrations and membrane stiffening at high deflections. It is therefore advantageous to provide a membrane having a high compliance, i.e. at least 25 nm/Pa, preferably at least 50 nm/Pa, more preferably at least 75 nm/Pa, although it will be appreciated that the benefits of the invention can be obtained at greater and lower compliances that these examples.

In a set of embodiments, the membrane is formed with at least one corrugation to reduce in-plane tension therein. It will be appreciated that when a corrugation is described as reducing in-plane tension in the membrane, this means that the in-plane tension is reduced compared with the in-plane tension that would be present in an equivalent membrane that does not have corrugations, but which is otherwise the same as the corrugated membrane. It will thus be appreciated by the skilled person that by providing at least one corrugation in the membrane to reduce in-plane tension therein, the mechanical properties of the membrane are changed compared with an equivalent membrane without corrugations.

In particular, an equivalent membrane manufactured without corrugations may have a high intrinsic tensile stress, and the provision of at least one corrugation may thus reduce the stress in a region of the membrane (as expressed, for example, in terms of the von Mises stress). As discussed further below, the local stress, e.g. in the region of the corrugation(s), may be increased, while the presence of the corrugation(s) relaxes the stress elsewhere in the membrane, e.g. near the centre of the membrane. Reducing the in-plane tension in the membrane can thus increase the compliance of the membrane.

As used herein, the term corrugation refers to an undulation in a surface that elsewhere is substantially planar on the length-scale of the undulation width, i.e. an undulation may be a ridge or groove in an otherwise substantially planar surface. The corrugation may be formed so that when viewed from one side of the surface the corrugation is a concave groove and on the other surface there is a corresponding convex ridge.

In some preferred embodiments, said membrane comprises a plurality of corrugations. The corrugations may be separated by a constant distance, e.g. they may be parallel lines or concentric rings. In embodiments having at least three corrugations, the spacing between adjacent pairs of corrugations may be the same, i.e. the corrugations may be evenly spaced.

Preferably the membrane comprises a central portion free of corrugations. In such embodiments, the optical element and light source are preferably arranged such that the light passing through or impinging on the optical element is incident substantially on the central portion of the membrane. This provides the advantage that the central portion may provide a suitable reflective surface, e.g. the central portion may be planar, while the provision of corrugations around the central portion can provide a general decrease in the membrane stress from a high stress at the edge of the membrane to a low stress at the centre of the membrane, resulting in the desired high compliance. In an example preferred embodiment, a plurality of corrugations is provided arranged in concentric circles near the edge of the membrane, while a central circular portion of the membrane is free of corrugations.

The Applicant has found that the properties of a membrane in accordance with the invention can advantageously be tuned and thus optimised by choosing particular parameters of the membrane and the corrugations, e.g. the membrane and corrugation dimensions, the number and/or position of the corrugations, etc.

The number of corrugations may be selected to satisfy a highest possible microphone sensitivity for a membrane of a given dimension (e.g. a given diameter) while keeping the resonance frequency above a particular threshold. The resonance frequency of a microphone corresponds to the upper limit of useful bandwidth, and for most purposes it is typically desired to keep the resonance frequency above the frequency range of sound waves that are audible to humans, e.g. above 20 kHz. In some preferred embodiments the number of corrugations in the membrane is between 10 and 30. In one example, for a 3 mm diameter membrane made of silicon nitride, 17 corrugations was found to provide the maximum compliance (and therefore sensitivity) while having a resonance frequency higher than 20 kHz.

In some preferred embodiments, the membrane and corrugations have the following preferred dimensions. The membrane may be circular. The membrane may have a maximum lateral dimension (e.g. a diameter) between 1 mm and 4 mm. The thickness of the membrane may be between 50 nm and 500 nm. The pitch of the corrugations may be between 5 μm and 15 μm. The width of the corrugations may be between 10 μm and 20 μm. The depth of the corrugations may be between 500 nm and 2000 nm. As used herein, "pitch" refers to the separation between corrugations, i.e. the width of a planar region separating two corrugations. "Width" refers to the minimum lateral dimension of the region of the surface of the membrane that forms the corrugation. "Depth" refers to the maximum perpendicular distance by which the corrugation surface deviates from the substantially planar surface in which the corrugation is formed.

It will be appreciated that the optimal parameters of the membrane and the corrugations may depend on the material from which the membrane is made. For example, the example parameter values mentioned above may be preferred in embodiments in which the membrane is made from silicon nitride ($Si_3N_4$).

The membrane may be made from any suitable material having the appropriate properties. Desired properties and parameters that may be considered when selecting a material include the weight and stiffness of the membrane (which affect the membrane vibrational modes); the material yield strength; the material Young's modulus; and the ease with which the material can be deposited with high repeatability, e.g. by low pressure chemical vapour deposition (LPCVD). It will be appreciated that the weight of the membrane will depend on dimensions of the membrane as well as the density of the membrane material. It will also be appreciated that the stiffness of the membrane will depend on the dimensions and shape of the membrane as well as the Young's modulus of the membrane material.

With regard to yield strength, as discussed in more detail below, the inclusion of one or more corrugations on the membrane can reduce the stress of the membrane significantly from the edge of the membrane to the centre (e.g. by a few orders of magnitude), leading to a high compliance. The decrease in the stress is mainly caused by the elongation of the membrane material resulting from corrugations (e.g. from successive corrugations). The provision of corrugations in the membrane results in successive high local tensile stresses (in the pitch and valley regions) and high local compressive stresses (at the corners between the pitch and valley regions). Accordingly, to reduce risk of mechanical failure (e.g. fracture) in the regions of high stress, the membrane preferably has a high yield strength, which may be achieved by choosing a suitable material for the membrane, e.g. by choosing a material with a sufficiently high Young's modulus, as discussed below.

As the microphone assembly is an optical microphone assembly, readout of the membrane's displacement does not rely on electrostatic phenomena as is the case in prior art microphones such as condenser microphones. There is therefore no requirement for the membrane to be conductive. Avoiding electrostatic actuation provides numerous advantages over prior art microphones that rely on applying an electrostatic charge to the membrane. As noted above, electrostatic readout or actuation can result in the membrane collapsing if it comes too close to a back electrode or grating. This makes it difficult to use membranes with high compliance, as a large displacement of the membrane is more likely to cause the membrane to collapse. Electrostatic actuation and readout also attract dust, or may be short-circuited by condensation and thus may be difficult to use in high humidity environments.

It will thus be appreciated that the choice of material may therefore be made based on mechanical and processing properties, and not necessarily on the material's electrical properties as it is not necessary for the membrane to be conducting.

Accordingly, in accordance with aspects other than the first, second and third aspects, the membrane may be conducting or semi-conducting, but in preferred embodiments, the membrane is non-conducting. In practice, many of the materials with suitable mechanical and processing properties are non-conducting. However, the advantages associated with not using electrostatic readout or actuation may also be achieved using a conducting or semi-conducting membrane if the conductive properties of the membrane are not used. In a set of embodiments of the method of the present invention, no electrical current or electrostatic charge is applied to the membrane during operation of the optical microphone assembly.

In some preferred embodiments the membrane material is a nitride material, although other materials, including semiconductor materials and carbide materials may be used. The membrane material may be selected from the group consisting of the materials listed in table 1 below.

TABLE 1

| Material | Young's Modulus (GPa) |
|---|---|
| Silicon Nitride ($Si_3N_4$) | 220-390 |
| Germanium Nitride ($Ge_3N_4$) | 200-300 |
| Aluminium Nitride (AlN) | 250-330 |
| Titanium Nitride (TiN) | 250-440 |
| Tantalum Nitride (TaN) | 400-900 |
| Diamond like carbon (DLC) | 200-250 |
| Silicon Carbide (SiC) | 400 |
| Polysilicon | 160 |

The Applicant has found the materials with a Young's modulus of 200 GPa or higher are particularly suitable for producing corrugated membranes with increased compliance. Accordingly, in some preferred embodiments, the membrane is made from a material with a Young's modulus of at least 200 GPa.

The Applicant has also appreciated that it is particularly advantageous to manufacture a corrugated membrane from a material which, when deposited without corrugations under the same deposition conditions as the membrane, has an intrinsic tensile stress of at least 1 GPa. Membranes manufactured from such materials advantageously exhibit increased stability of the compliance with respect to temperature variations. When a membrane is manufactured from such a material, the presence of one or more corrugations has the effect of relaxing the high tensile stress in regions away from the edge of the membrane, so that the corrugated membrane has a much higher tensile stress at the edge of the membrane than at the centre. The lower stress region in the centre provides increased compliance, while the higher stress region acts as a buffer against temperature variations because the high tensile stress regions exhibit a significantly smaller change in mechanical properties with temperature variations.

Accordingly, in preferred embodiments, the membrane is made from a material which, when deposited as a planar membrane of the same dimensions as the membrane, has an intrinsic tensile stress of at least 1 GPa.

More generally, the membrane material may be selected so that the tensile stress at a periphery of the membrane is at least 800 MPa, wherein said membrane is formed with at least one corrugation so that the tensile stress in a central region of the membrane in less than the tensile stress at the periphery.

It will be appreciated that the reduction in tensile stress in the central portion compared with the periphery results at least in part from the presence of the corrugation(s). The central portion may be separated from the periphery by the at corrugation(s), e.g. the central region may be surrounded by the corrugation(s). The tensile stress in the central region of the membrane may be less than 50% of the tensile stress at the periphery.

In accordance with any aspect of the invention, the tensile stress (e.g. von Mises stress) in a central region of the membrane may be less than 50 MPa, which may result in a membrane compliance of approximately 200 nm/Pa. This feature is particularly preferred in embodiments in which the membrane is made from a material which, when deposited as an equivalent planar membrane, has an intrinsic tensile stress of at least 1 GPa. It will be appreciated that the reduction in tensile stress may be achieved through selection of appropriate corrugation parameters (e.g. number, position and/or dimension of corrugations) as taught above.

Regarding the ease of deposition, silicon nitride ($Si_3N_4$) can be deposited via LPCVD (low pressure chemical vapour deposition) with good repeatability. Accordingly, in some preferred embodiments, the membrane material comprises silicon nitride.

The membrane is preferably disposed on a support, e.g. an annular mount. The support may comprise silicon. The support may be mounted on a substrate, e.g. a glass substrate.

In a set of embodiments, the optical microphone assembly comprises a plurality of optical elements, wherein each of the optical elements comprises and/or is disposed on a surface of the substrate, and wherein a respective optical path length between the membrane and each optical element for light propagating from the light source to one of the detectors is different for each optical element.

Such an arrangement advantageously allows the dynamic range of the microphone to be extended. The different optical path lengths provide different phase offsets, resulting in multiple optical signals with relative phase offsets. Combining the signals to provide an optical measurement can extend the operation range of the microphone.

The difference in optical path length may be provided by positioning the optical elements with different height offsets relative to the grating, e.g. by using a substrate having a stepped profile. However, it is not essential for the optical path difference to be provided by a difference in the physical distance between the optical elements and the grating. The difference in optical path length may be provided in other ways, without necessarily requiring a substrate having a non-planar profile.

A further advantage of this invention lies in the fact that the optical element forming part of the interferometric arrangement is disposed on and/or comprises a surface of a rigid substrate. This is advantageous because it allows the optical element and/or other optical component structures with low aspect ratios to be fabricated on the surface (for example, a diffraction grating can be fabricated by thin reflective lines, e.g. of gold, on the substrate surface). This is in contrast with optical structures of the prior art, e.g. where a thin suspended structure is used. In such structures, optical elements are typically fabricated as stand-alone elements, i.e. the suspended structure is the optical element, and so the thickness of the optical element is the thickness of the suspended structure. This is problematic for a number of reasons. For example, it can be difficult to make the suspended structure stiff enough to avoid vibrations. For example, where a diffractive element is provided by slits in a suspended structure, the structure cannot be more than a few micrometres thick due to the difficulty of micromachining high aspect ratio structures. Further, even where a higher aspect ratio structure is possible, the high aspect ratio can introduce undesirable shadowing effects, degrading the microphone sensitivity. Providing a rigid substrate allows for rigidly supported, lower aspect ratio optical structures that are more easily fabricated.

As noted above, other useful optical structures can be fabricated on the substrate, e.g. by deposition of materials, etching, or other surface treatments, to provide other optical functions at one or more regions of the substrate. The substrate may comprise an etched recess positioned to reduce an amount of light that is reflected back from the substrate towards the light source or to limit or select the light reflected towards the photo detectors. The substrate may comprise an anti-reflection coating on one or both sides of the substrate. A diffractive optical element by be implemented by grooves of a suitable depth in the substrate, e.g. if the substrate is opaque. Other examples include, without limitation, one or more of the following:

- Optical films in order to implement one or more optical functions, such as adjusting the reflection at the surface of the readout substrate (e.g. anti-reflection films may be deposited on both sides of the readout substrate, in order to increase the optical throughput of the sensor), introducing optical delays or other optical functions.
- Optical delays can be created by etching recesses in certain areas of the readout substrate surface.
- Optically opaque regions can be created on the surface of the readout substrate, for example by etching a curved pit that will spread light on its convex side. This may prove useful to limit the amount of light reflected towards the light source (as light reflected back to certain sources may increase noise), as well as the amount of light reflected to the photo detector (e.g. if the photo detector is required only to measure light in a certain diffraction order of the grating).
- A microlens may be created on the surface of the readout substrate in order to focus light from the light source.
- A thin film that increases reflection from the surface of the readout substrate may be deposited, e.g. in embodiments where the interferometric arrangement is configured as a Fabry Perot interferometer.
- Nano or microstructuring of the surface of the readout substrate may also be used to implement various optical functions.

In a set of embodiments, the optical microphone assembly comprises a mount having a recess, the light source and/or the photo detector being mounted in the recess, wherein the mount is sealed to the substrate to form a sealed cavity containing the light source and/or photo detector. Providing such a mount sealed to the substrate is advantageous for at least two reasons. First, the light source and/or photo detector sealed in the mount are protected from dust and other contaminants that could otherwise degrade the microphone sensitivity. Second, the mount benefits from the rigidity of the substrate by virtue of being sealed to the substrate. The light source and/or photo detector in the mount may therefore be subject to less vibration and/or movement due to stress on the optical microphone assembly. Such vibration/movement can interfere with the microphone readout and/or require recalibration of the optical microphone assembly.

The light source and photo detector may be combined in a single module contained in the mount sealed to the substrate. The module may be a PCB or a ceramic circuit onto which the light source and photo detector are mounted. There may be several modules with different electro-optical components mounted on them and independently mounted onto the surface of the readout substrate. The module may consist of a silicon chip with integrated photo detectors, onto which a light source may be mounted. The light source and photo detector may be mounted directly onto a surface of the substrate.

Generally in accordance with the invention, more than one light source and/or more than one photo detector may be provided, and references to the light source and the photo detector may refer, where applicable, to light sources and photo detectors respectively.

In accordance with the invention, a variety of different configurations of the interferometric arrangement, the light source and the photo detector are possible.

In a set of embodiments, the substrate is at least partially transparent to radiation emitted by the light source. For example, the substrate may be made of glass, e.g. for light sources having a wavelength in the visible or near-IR range (e.g. for a VCSEL—a vertical-cavity surface-emitting laser). The substrate may be made of silicon, e.g. for wavelengths>1100 nm. The light source and photo detector may be positioned so that at least one of the first and second light paths passes through the substrate. The light source may be positioned to illuminate the optical element such that the first portion of light passes through the optical element to the membrane to be reflected by the membrane and the second portion of light is reflected from the optical element.

In a set of embodiments, the membrane is at least partially transparent to radiation emitted by the light source. The light source and photo detector may be positioned so that at least one of the first and second light paths passes through the membrane. The light source may be positioned to illuminate the membrane such that the first portion of light passes through the membrane to the optical element to be reflected by the optical element and the second portion of light is reflected from the membrane.

In a set of embodiments, neither of the first or second optical paths passes through the substrate. In such embodiments, the substrate may be opaque to radiation emitted by the light source.

When it is said that the first and second portions of light propagate via the interferometric arrangement, it should be understood that this means each light portion may propagate through the interferometric arrangement (i.e. entering an interstitial volume defined by the space between the membrane and the optical element) or may be reflected from the membrane or the optical element without entering the interstitial volume. Where one or both portions of light enters the interstitial volume, the light portion may be internally reflected one or more times before leaving the interstitial volume via the membrane or the optical element. It will be appreciated that there may be more than two light portions propagating along respective optical paths.

The membrane and optical element may be flat and parallel to each other. One or both of the membrane and the optical element may be partially reflective, e.g. having a reflectivity of greater than 10%, greater than 50% or greater than 90%, but less than 100%. One of the membrane and the optical element may be non-transmissive. The membrane and optical element may be configured and positioned so that light from the light source enters the cavity where it is internally reflected multiple times, and on each reflection, a portion of the light is transmitted out of the cavity. The composite radiation consisting of the transmitted portions leaving via either the membrane or the optical element may then be measured, from which the separation between the membrane and the optical element may be determined. It will be appreciated that the radiation that is detected and measured may be radiation emerging from the same side of the interferometric arrangement as the incident radiation (i.e. the same side as the light source) or the opposite side, i.e. the light source and photo detector may be on the same side of the interferometric arrangement or on different sides.

In a set of embodiments, the interferometric arrangement is configured as a Fabry-Perot interferometer.

The optical element may be any optical element that is able to split incident light into two portions by transmitting a first portion of the light and reflecting a second portion of the light. In preferred embodiments, the optical element is a diffractive optical element, although other diffractive and non-diffractive optical elements could be used, e.g. a diffractive lens or a partially reflective surface, such as is described in U.S. Pat. No. 7,164,479. The optical element may consist simply of the interface between the substrate and ambient atmosphere (the interface being provided without or without a surface treatment).

The optical microphone assembly may comprise a processor or processing means configured to process signals generated by the photo detector in response to an interference pattern detected at the photo detector. Additionally or alternatively the optical microphone assembly may comprise a connection for transmitting signals generated by the photo detector to a remote processor.

As discussed above, providing the optical microphone assembly with a high compliance membrane can provide numerous advantages. Some of these advantages are described below.

As mentioned previously, using a highly compliant membrane in a microphone may improve the sensitivity of the microphone. The self-noise of an optical microphone is typically dominated by the contribution of the readout mechanisms, consisting of shot noise at the detector, laser noise (Relative Intensity Noise) and noise in the electronic circuitry. These noise sources are independent of the membrane compliance. Thus, increasing the compliance of a membrane will proportionally increase the signal-to-noise ratio (SNR) of an optical microphone.

For the microphone self-noise to be dominated by the noise mechanisms described above, it is assumed that the squeeze film noise that is created by the air being squeezed out of the area between the membrane and the optical element(s) is low. This noise is highly dependent on the gap between the membrane and the optical element(s). Thus, if this gap is large enough, the squeeze film noise will be negligible, providing the advantageous proportional increase in SNR discussed above. However, a large gap is not an essential feature of the invention, and embodiments without this feature may nevertheless be advantageous.

Increasing the compliance of the membrane also increases the range of motion of the membrane in the presence of large acoustic pressures. For example, a membrane with a compliance of 100 nm/Pa would show a motion of almost +/−15 μm when a sound pressure level of 134 dB is applied to the microphone. Such a sound pressure level is typical of the maximum a microphone must be able to measure with a distortion below 10% (often defined as the Acoustic Overload Point). Under the considerations described above, the membrane would need to be free to travel at least 15 μm in both directions in order to be able to measure a sound pressure level of 134 dB. However, such a travel distance is much more than the typical gap between the membrane and back electrode of a condenser MEMS microphone, which is typically of the order of a few microns. Increasing this gap in a condenser MEMS microphone would cause a deterioration in its performance in terms of sensitivity and SNR, because the capacitance of the microphone is inversely proportional to the gap. On the other hand, the readout sensitivity of an optical microphone is not dependent on the distance between the optical element(s) and the membrane (as long as the self-noise is not squeeze-film dominated). The optical element(s) can therefore be placed at a distance of 15 μm or more from the membrane without causing a deterioration the sensitivity of the microphone. In some embodiments, the distance between the optical element and the membrane (e.g. the membrane equilibrium position) is at least 15 μm. Such a distance would typically also ensure that the self-noise of the microphone is not dominated by squeeze-film noise. In some embodiments, the distance between the optical element and the membrane is between 5 μm and 50 μm, preferably between 10 μm and 20 μm, more preferably around 15 μm.

To summarize the advantages mentioned above, by using a highly compliant membrane in combination with an optical readout it may be possible to achieve a combination of high signal-to-noise ratio and high dynamic range (the difference between the largest and smallest pressure the microphone is able to detect). This combination may be achievable by increasing the gap between the membrane and the optical element(s) in an optical microphone assembly compared to previous proposals. In contrast, increasing the distance between the membrane and back-electrode of a MEMS condenser microphone would deteriorate its signal-to-noise ratio.

Another advantage of a large gap is the higher robustness against dust particles that can become trapped between the membrane and the optical element(s) (for an optical microphone) or back electrode (for a condenser microphone). In the presence of a small gap, these particles could easily mechanically block the normal motion of the membrane or electrically short-circuit the membrane and back-plate. This problem widely affects condenser MEMS microphones and special attention must be paid to preventing particles from travelling to the back side of the membrane both during assembly and under use. Electrostatic loading of the membrane, as employed in prior art arrangements, aggravates this weakness as it attracts charged particles. Optical microphone assemblies in accordance with the present invention thus have a fundamental advantage as they can operate with a large gap and do not require electrostatic charging of the membrane.

As noted above, embodiments of the present invention make possible the fabrication of microphones with high signal-to-noise ratio. The high signal-to-noise ratio means that microphones in accordance with the invention may advantageously be employed in microphone arrays.

Microphone arrays can have two or more microphones, enabling the array to capture directional properties of a sound field. In particular, when using two microphones, a first-order differential microphone can be created by subtracting the two microphone signals from each other, creating a difference signal. When the sound wavelength is large compared to the microphone spacing, the resulting difference signal will have a low amplitude. However, the microphone signals will contain spatially uncorrelated self-noise, resulting from electrical or thermo-acoustic noise generated in the microphones. The difference signal will thus contain an addition of the energy in the self-noise signals, since they are not correlated. Consequently, the desired acoustic signal is attenuated, while the self-noise is amplified, decreasing the SNR at the array output. High SNR microphones in accordance with the present invention may thus be used to provide improved differential microphone arrays, particularly small arrays.

This can be extended to arrays with more microphones, commonly referred to as superdirective arrays. In such arrays, maximum directivity index (DI) is obtained with filter-and-sum beamforming methods. DI is defined as the array output power from the desired signal in the array steering direction, divided by the array output power from a spatially diffuse sound field, expressed in decibels. Microphone arrays can obtain superdirectivity when the microphone spacing is smaller than half an acoustic wavelength of the frequency of interest. Superdirectivity can be mathematically derived by minimising the output power of the array, with a distortionless constraint in the steering direction, assuming that the reverberant sound field is diffuse and no microphone self-noise is present. This enables a close to frequency-independent beam pattern in the previously defined frequency operating range. However, such superdirective arrays largely amplify the microphone self-noise at low frequencies, due to the violation of the assumption that no microphone self-noise is present. Consequently, the superdirectivity must be constrained at low frequencies, yielding a wider beam pattern, decreasing the array's ability to suppress reverberation and noise.

As an example, an array with an inter-microphone spacing of 5 cm can be made superdirective below the frequency of 3400 Hz, assuming the speed of sound is 340 m/s.

Microphone assemblies in accordance with the present invention may thus be advantageously employed in superdirective arrays. For example, by using high-SNR microphones with 80 dB or better SNR, in a 7.5 cm diameter circular array with seven microphones, at the frequency of 500 Hz, it may be possible to increase the DI from 2.9 to 7.4 dB, compared to an identical array with 65 dB SNR microphones. This assumes a White Noise Gain (WNG) of 5 dB with low-SNR microphones, and a WNG of −10 dB with high-SNR microphones, yielding the same array output SNR but an increased DI value.

Microphone assemblies in accordance with the invention may be manufactured using micro-electro-mechanical systems (MEMS) processes. As noted above, the meaning of the term "MEMS" is well known in the art, and the skilled person would be able to ascertain from the structure of a microphone whether it has been manufactured using processes that fall within the understood meaning of the term "MEMS". An advantage of manufacturing a high-SNR microphone with MEMS processes is that a good matching between microphone samples can be achieved with high-volume MEMS production, typically below 1 dB standard deviation. Also, the temperature drift of an electret condenser microphone may be an order of magnitude larger than than the drift of a MEMS microphone. In array applications, matched sensitivity of the microphones is very important to obtain good performance, as all microphone imperfections, including self-noise, matching errors and positioning errors will influence the amount of superdirectivity that can be obtained.

Certain preferred embodiments will now be described, by way of example only, with reference to the accompanying drawings, in which.

Figure 25A:
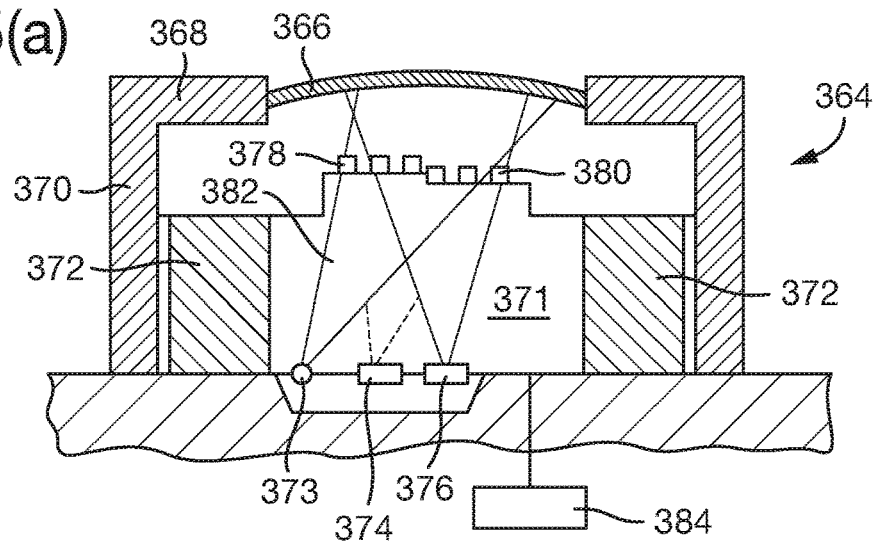
Figure 25B:
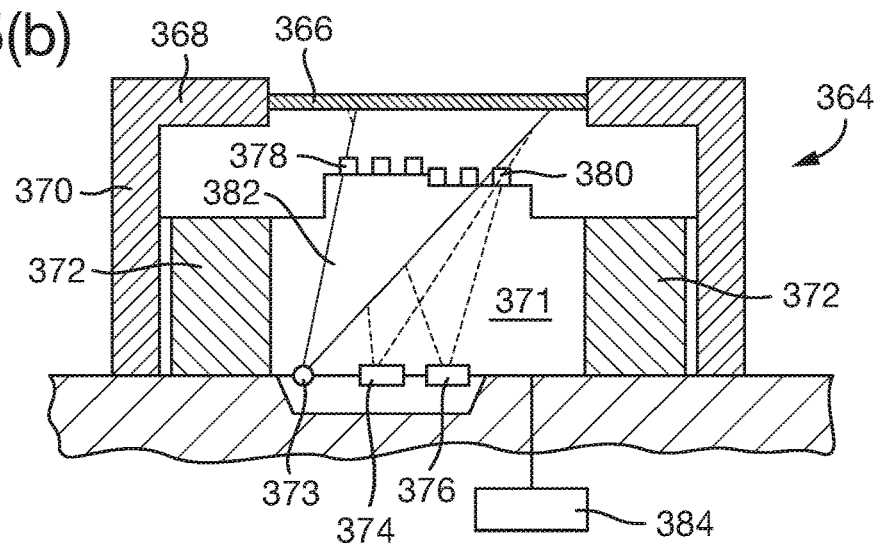
Figure 25C:
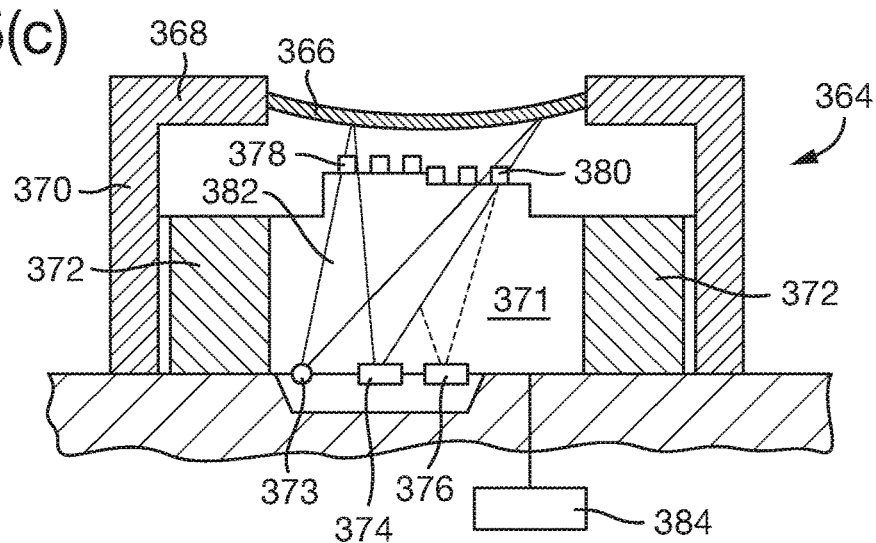
Figure 26:
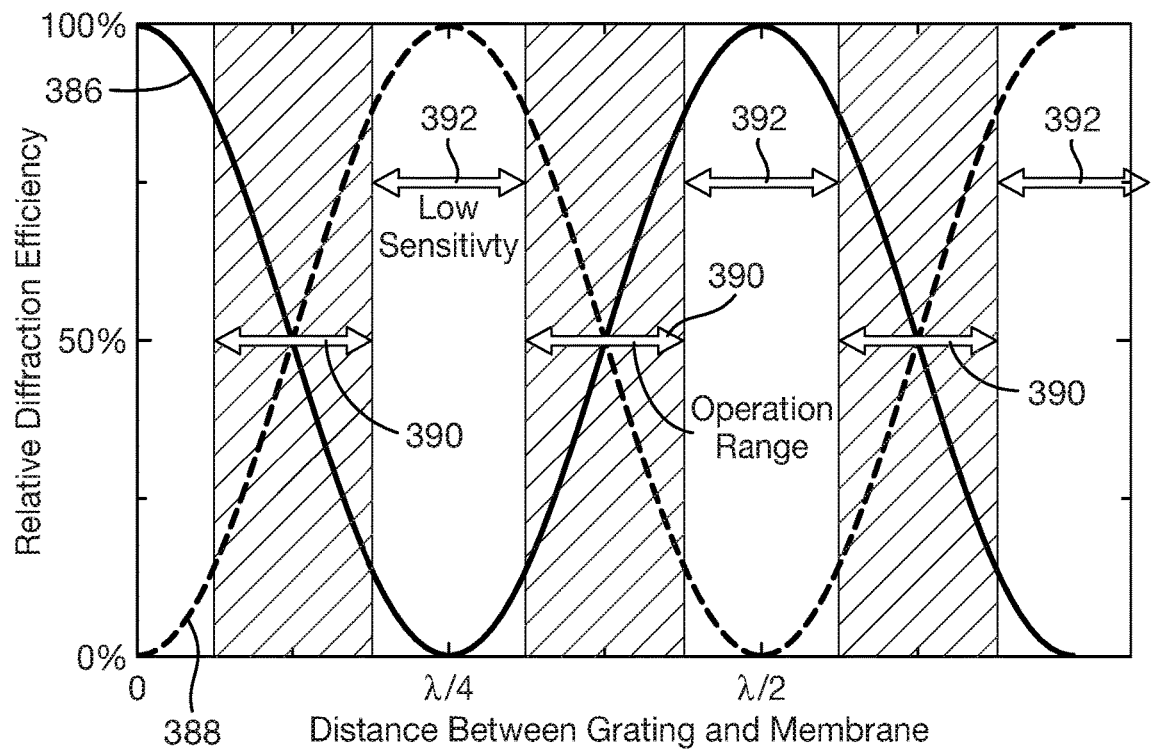

FIGS. 24(*a*)-(*h*) show successive stages in a manufacturing process for producing a membrane for use in optical microphone assemblies in accordance with the present invention;

FIGS. 25(*a*)-(*c*) show a schematic representations of an optical microphone for use in optical microphone assemblies in accordance the invention; and FIG. 26 shows a graph indicating the operation ranges of an optical microphone having a single grating.

Figure 27:
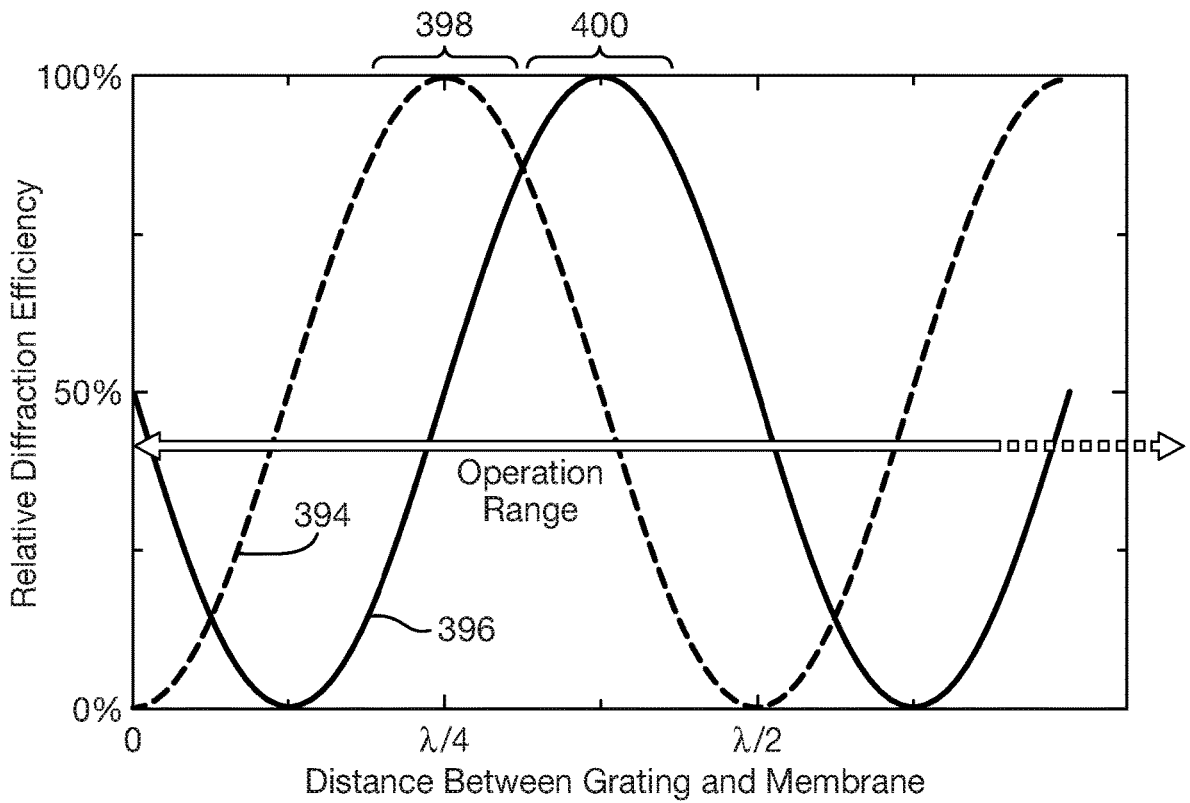

FIG. 27 shows a graph indicating the extended operating range of an optical microphone having two gratings with a relative height offset.

FIG. 28 shows a further example of an optical microphone for use in optical microphone assemblies in accordance with the invention.

Figure 1:
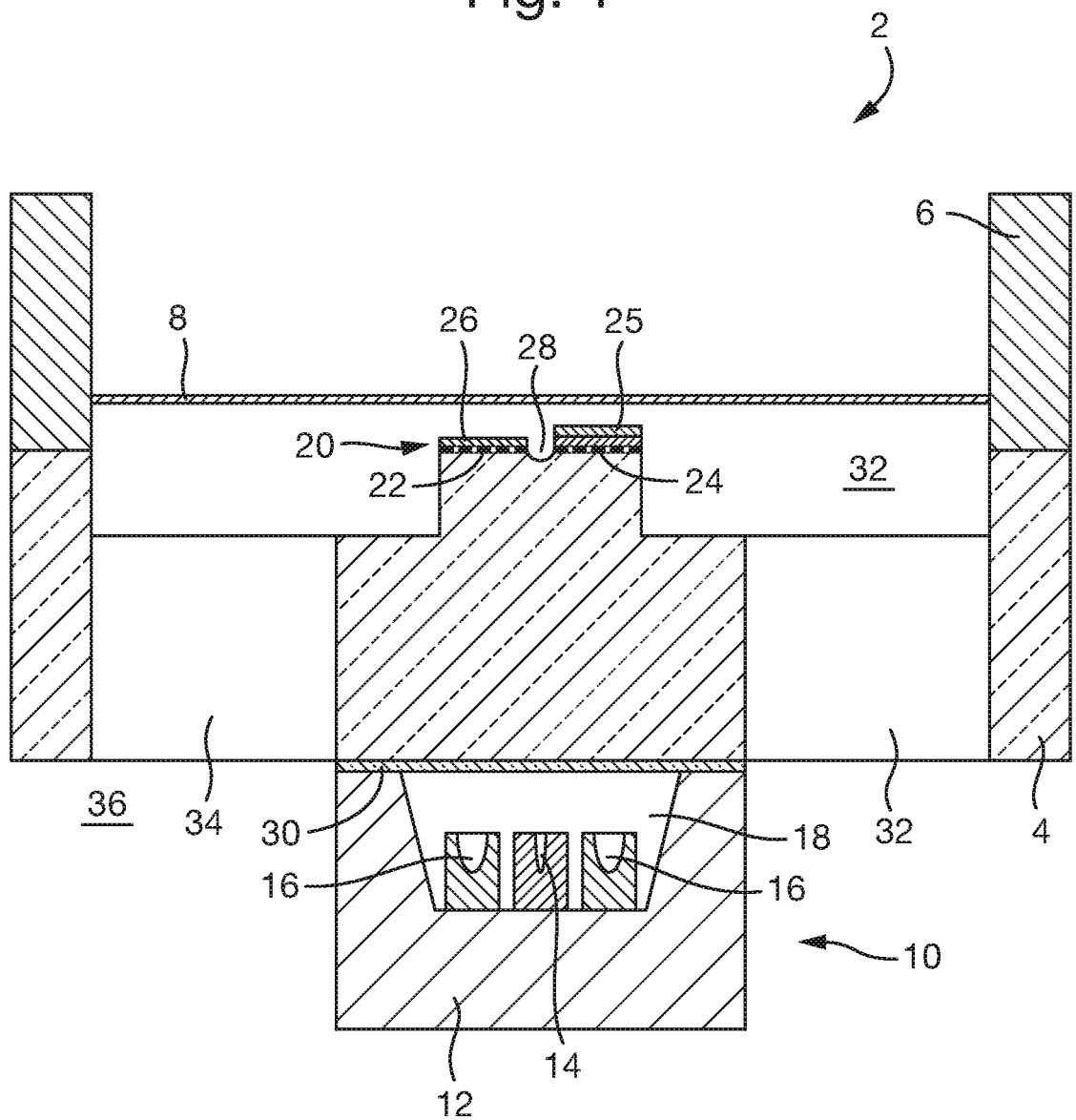
FIG. 1 shows an optical microphone for use in optical microphone assemblies in accordance with the present invention.

FIG. 1 shows an optical microphone for use in optical microphone assemblies in accordance with the present invention. The optical microphone 2 comprises a substrate 4 and a microphone chip 6, which comprises a membrane 8. The optical microphone 2 also comprises an optical readout module 10, which comprises a mount 12, a light source 14 (e.g. a VCSEL: a vertical-cavity surface-emitting laser), and two photo detectors 16. The optical readout module 10 is sealed to the bottom of the substrate 4 so that the light source 14 and photo detectors 16 are sealed within a recess 18 in the mount 12. This protects the light source 14 and photo detectors 16 from contaminants such as dust. The microphone chip 6 and membrane 8 are positioned on top of the substrate 4 so as to provide the membrane in a spaced relationship with an upper surface region 20 of the substrate 4.

In use, the light source 14 emits radiation towards the upper surface 20. A first portion of the radiation is reflected back from the upper surface 20 and impinges on the photo detectors 16. A second portion of the radiation is transmitted through the upper surface 20 and is reflected from the membrane 8 back through the substrate and impinges on the photo detectors 16. Each portion is also diffracted by a diffraction grating on the upper surface 20, which is described below. Where the first and second portions overlap, the radiation interferes. The resultant intensity of radiation at the photo detectors depends on the distance between the two reflecting surfaces, i.e. the distance between the membrane 8 and the upper surface 20 of the substrate 4. As such, the intensity detected at the photo detectors 16 can be related to the separation between the membrane 8 and the upper surface 20, and thus to the movement of the membrane 8 when subject to an acoustic wave which causes the membrane 8 to vibrate.

The upper surface 20 is divided into two regions, each provided with a patterned dielectric film 22, 24. Each patterned dielectric film functions as a diffraction grating. An optical delay layer 25 is provided on top of the patterned dielectric film 24. This increases the optical path length between the patterned dielectric film 24 and the membrane 8 compared with the corresponding optical path length between the other patterned dielectric film 22 and the membrane 8. This difference in optical separation can be used to increase the operating range of the microphone in the manner described below with reference to FIGS. 25(a)-(c). However, as will be appreciated from the invention as defined above, it is not essential to provide two separate optical elements, or to configure the microphone to extend the operating range. A single optical element may be used (e.g. by providing only one patterned dielectric film across the entire of surface 20, without providing an optical delay film). Similarly, a single photo detector may be used.

In the present embodiment, the upper surface 20 is provided with other surface treatments to provide optical functions. The upper surface 20 is also provided with an anti-reflection coating 26, whose properties are selected to set the ratio of the amplitude of transmitted and reflected radiation according to desired parameters. In addition, a portion of the surface is etched to provide an optical spreader 28 to minimize the specular reflections from the surface. An anti-reflection coating 30 is provided on the lower surface of the substrate 4 to improve the coupling of radiation into and through the substrate 4.

The position of the microphone chip 6 and membrane 8 over the substrate 4 defines an interstitial volume 32 between the membrane 8 and the substrate 4. The substrate 4 is provided with air channels 34 providing a passage for air between the interstitial volume 32 and a region 36 beneath the substrate 4.

As will be seen from the subsequent discussion of the following Figures, the optical microphone 2 may be arranged in an optical microphone assembly such that the air channels 34 connect the interstitial volume 32 with the exterior of the optical microphone assembly. This allows an acoustic wave outside the assembly to propagate through to air channels 34 to impinge on the membrane 8. The optical microphone 2 may be arranged in an optical microphone assembly so that the air channels 34 connect the interstitial volume 32 with an acoustic cavity (also known in the art as a back volume). These embodiments are discussed in more detail below.

Figure 2:
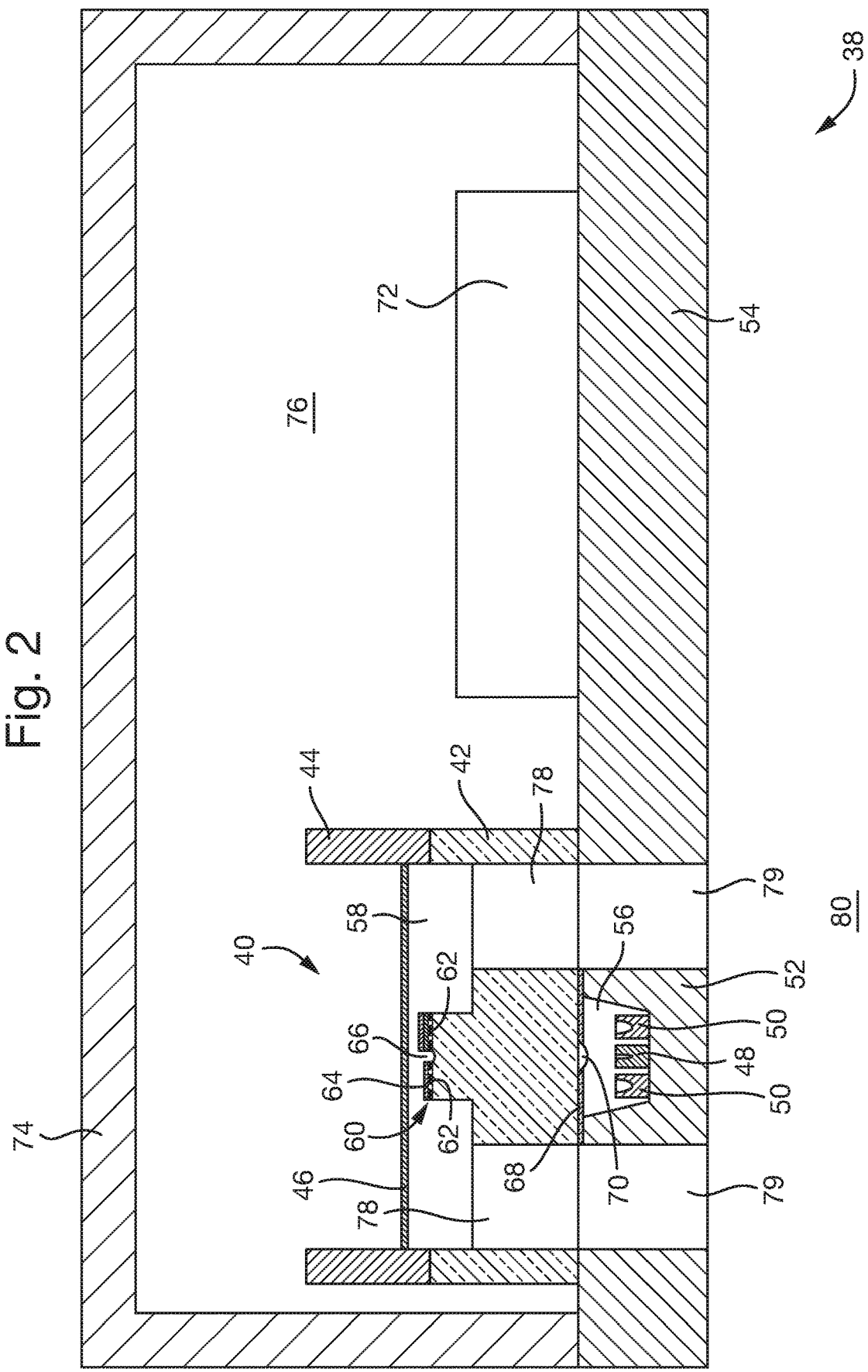
FIG. 2 shows an embodiment of an optical microphone assembly in accordance with the present invention.

FIG. 2 shows an embodiment of an optical microphone assembly 38 in accordance with the present invention. The optical microphone assembly 38 comprises an optical microphone 40 that is structurally similar and functionally equivalent to the optical microphone 2 shown in FIG. 1. The optical microphone 40 comprises a substrate 42, a microphone chip 44 having a membrane 46, a light source (VCSEL) 48 and photo detectors 50. The VCSEL 48 and photo detectors 50 are provided in an optical readout module 52 that is functionally equivalent to the optical readout module 12 of FIG. 1, but the optical readout module 52 is integrally formed with a base 54 which supports other components as well as the substrate 42, as discussed below.

The substrate 42 is sealed to the base 54 so as to seal the VCSEL 48 and photo detectors 50 in a recess 56. The microphone chip 44 is positioned on top of the substrate 42 in a similar manner to that described in FIG. 1 so as to provide an interstitial volume 58 between the membrane 46 and the substrate 42. An upper surface 60 of the substrate is provided with equivalent surface treatments to those on the surface 20 in FIG. 1. The lower surface of the substrate is provided with an anti-reflection coating 68 and a lens 70 for coupling radiation into and through the substrate 42. Also provided on the base 54 is an application-specific integrated circuit (ASIC) chip 72. The ASIC chip 72 is connected via connections (not shown) to the VCSEL 48 and photo detectors 50 for controlling operation of the optical microphone 40 and receiving data relating to the recorded intensity of radiation at the photo detectors 50.

The optical microphone assembly 38 is provided with an enclosure 74. The enclosure is sealed to the base 54 defining an acoustic cavity 76. The acoustic cavity 76 encloses a volume of air. Such an acoustic cavity may also be known in the art as a "back volume", and its function is explained below.

The substrate 42 and the base 54 have respective sets of air channels 78, 79 therethrough, providing a passage for air between the interstitial volume 58 and the exterior 80 of the optical microphone assembly 38.

In use, an approaching acoustic wave propagates through the air channels 78, 79 and impinges on the membrane 46, causing the membrane 46 to vibrate. The movement of the membrane 46 is measured in the manner described with reference to FIGS. 1 and 25 (a)-(c). To facilitate accurate measurement of the acoustic wave via the movement of the membrane, the enclosure 74 substantially isolates the air in the acoustic cavity 76 from the ambient air in which the acoustic wave is travelling. Consequently, the pressure of the air in the acoustic cavity 76 is approximately constant. When the membrane 46 vibrates, the total volume of the acoustic cavity 76 changes slightly, affecting the pressure therein. For example, when the membrane 46 moves away from the substrate, the air in the acoustic cavity 76 is compressed. When the membrane moves toward the substrate, the air in the cavity is de-compressed. This change in pressure results in a slight reduction in the amplitude of the membrane vibration compared with the ideal situation in which the acoustic cavity 76 pressure is perfectly constant. This is equivalent to an effecting stiffening of the membrane 46. However, as can be seen from FIG. 2, the volume of the acoustic cavity 76 is very large compared with the volume of air displaced by the vibrating membrane. Consequentially, the increase in effective stiffness of the membrane 46 is very small, even though, due to the high compliance of the membrane, the magnitude of membrane defection is larger than would be seen in an equivalent low compliance membrane. The increase in effective stiffness of the membrane therefore does not significantly degrade the sensitivity of the microphone.

It can also be seen from FIG. 2 that the thickness of the substrate is large and therefore rigid, making the substrate (and thus the microphone readout) robust against the effects of vibrations from the incoming acoustic wave or any noise. The sensitivity of the microphone is therefore not degraded by such vibrations.

Figure 3:
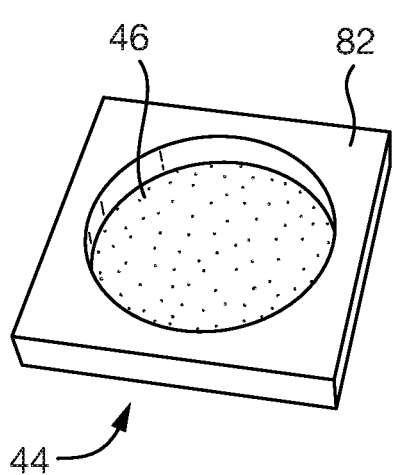
FIG. 3 shows a perspective view of the microphone chip of the embodiment of FIG. 2.

FIG. 3 shows a perspective view of the microphone chip 44 of FIG. 2. The microphone chip 44 comprises a frame 82 containing a circular membrane 46. The microphone chip 44 may be manufactured using the methods described below with reference to FIGS. 24(a) to (h).

Figure 4:
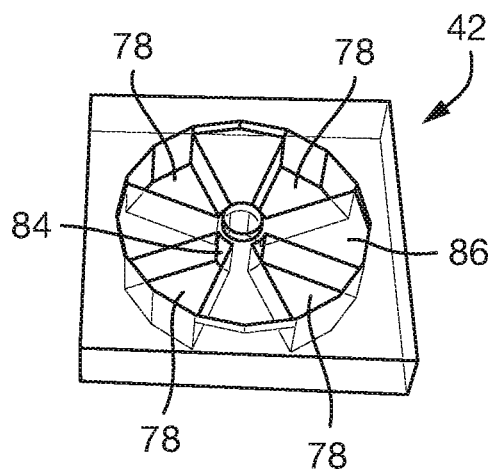
FIG. 4 shows a perspective view of the substrate of the embodiment of FIG. 2.

FIG. 4 shows a perspective view of the substrate of the embodiment of FIG. 2. The substrate 42 is transparent, and comprises air channels 78 providing a passage for air through the substrate 42. The particular examples of the microphone chip 44 and substrate 42 shown in FIGS. 3 and 4 are suitable for use in the embodiment of FIG. 2 and other embodiments. However, it will be understood that the optical microphone assemblies in the depicted embodiments and other embodiments may have microphone chips and/or substrates that differ from the particular embodiments shown in FIGS. 3 and 4.

In the embodiment of FIG. 4 there are four air channels 78 extending radially from a central portion 84, such that the air channels 78 have a substantially circular cross section. An optical element is provided on the surface of the transparent substrate 42 on the central portion 84. In the embodiment of FIG. 2, the optical element comprises the patterned dielectric films 62, the optical delay 25, the anti-reflection coating 64, and the optical spreader 66. In other embodiments, other optical elements comprising and/or disposed on the surface of the substrate may be used.

Figure 5:
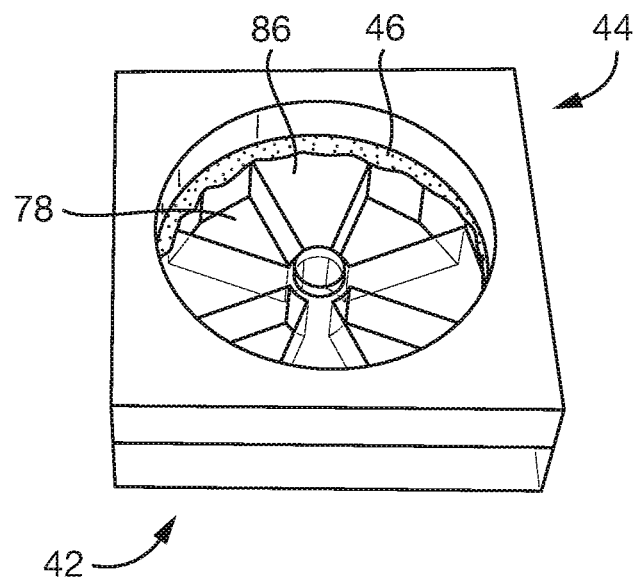
FIG. 5 shows a perspective view of the microphone chip of FIG. 4 mounted on top of the substrate of FIG. 5.

FIG. 5 shows a perspective view of the microphone chip 44 mounted on top of the transparent substrate 42. It can be seen that the circular envelope of the air channels 78 in the substrate 42 substantially overlaps with the membrane 46. The air channels 78 thus provide a large passage for air providing fluid communication with the membrane surface, while the portions 86 of the transparent substrate 42 between the air channels 78 provide rigid support for the central portion 84 on which the optical element is mounted.

Figure 6:
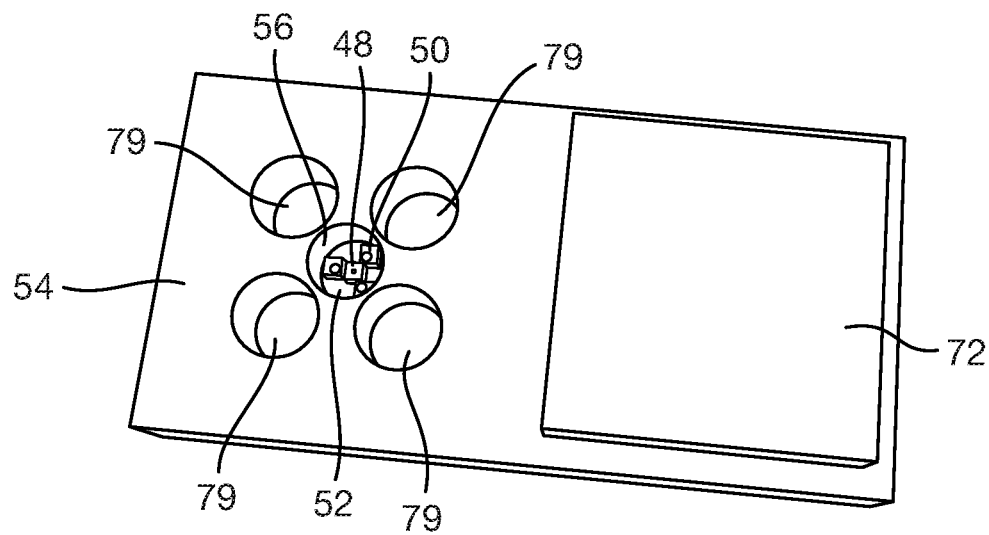
FIG. 6 shows a perspective view of the base and optical readout module of the embodiment of FIG. 2.

FIG. 6 shows a perspective view of the base 54 comprising the optical readout module 52. It will again be appreciated that the particular example of the base 54 of FIG. 6 is just one example module that may be used with FIG. 2. It may be used with other optical microphone assembly embodiments and similarly other suitable bases can be used with the embodiment of FIG. 2.

The optical module includes a recess 56 in which a VCSEL 48 and three photo detectors 50 are mounted. It will be appreciated that more or fewer than three photo detectors may be used, depending on the configuration and operation of the particular embodiment of the optical microphone assembly. The ASIC chip 72 is positioned to the side of the optical readout module 52. Surrounding the optical readout module 52 are air channels 79. In the example of FIG. 6, there are four air channels, each having a circular shape arranged equally spaced and equidistant from the optical readout module 52. It will be appreciated that other shapes and configurations of the air channel 79 may be used. For example, the air channels 79 may have the same shape and position as the air channels 78 in the substrate 42, such that the air channels 78 in the substrate 42 overlap with the air channels 79 in the readout module base 54.

Figure 7:
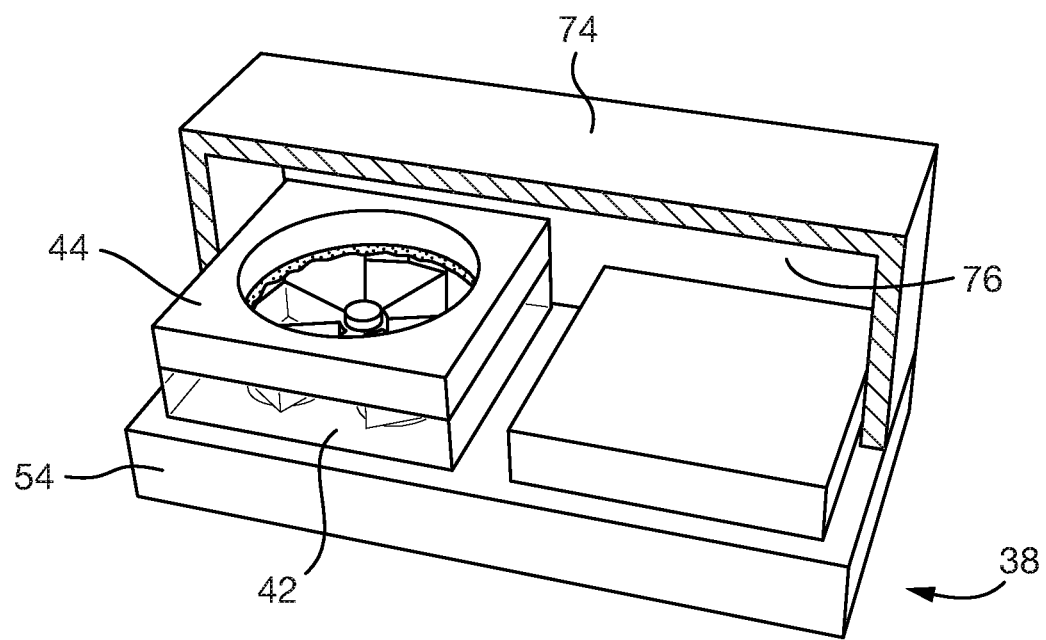
FIG. 7 shows a cut-away perspective view of the optical microphone assembly of FIG. 2.

FIG. 7 shows a cut-away perspective view of the optical microphone assembly of FIG. 2, showing the assembled components described above, i.e. the microphone chip 44, the substrate 42, and the base 54. The enclosure 74 is depicted partly cut away to show the internal components of the optical microphone assembly 38. It can be seen that the enclosure encloses an acoustic cavity 76 having a large volume.

Figure 8:
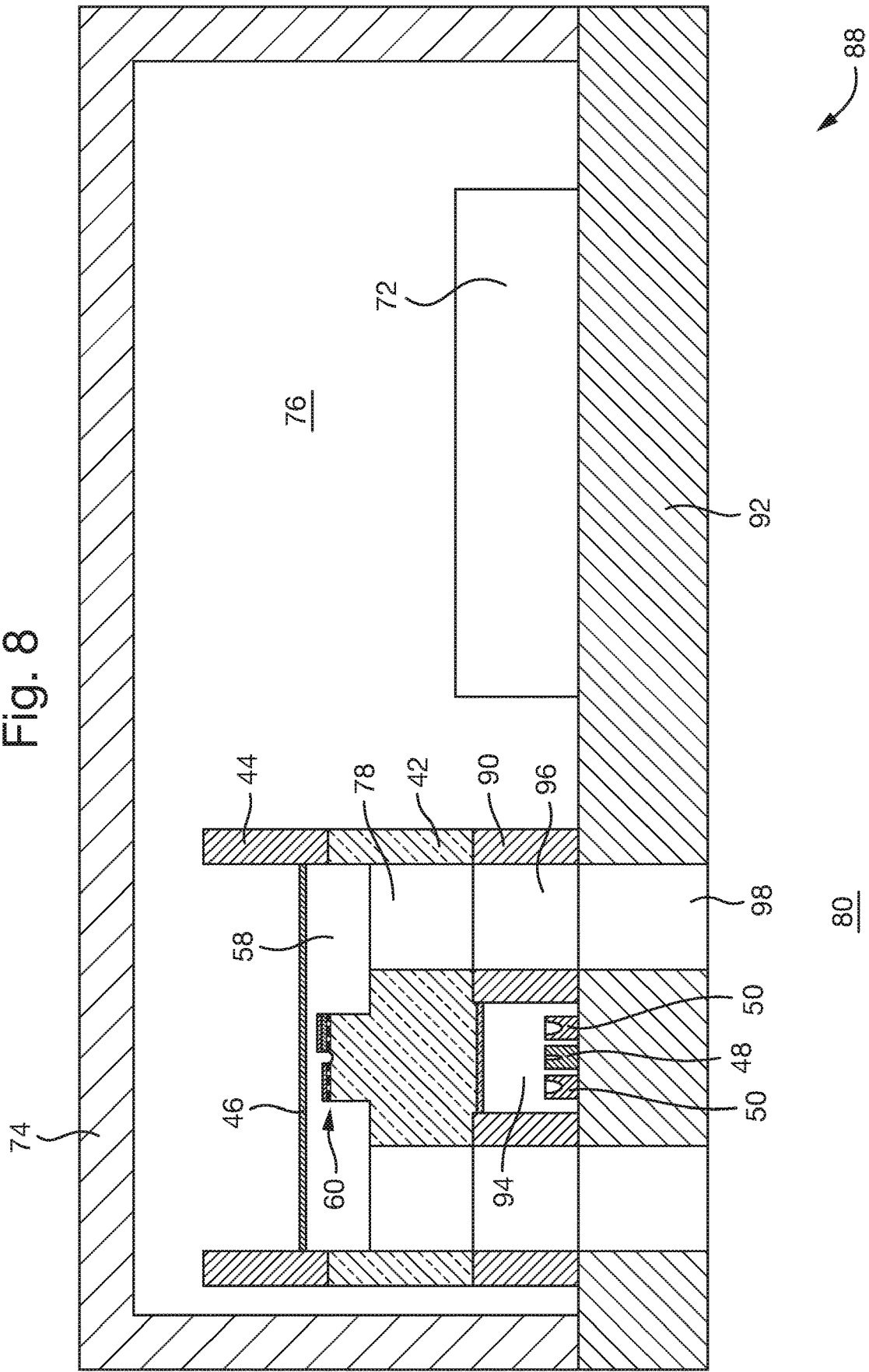
FIG. 8 shows a second embodiment of an optical microphone assembly in accordance with the present invention.

FIG. 8 shows a second embodiment of an optical microphone assembly 88 in accordance with the present invention. The optical microphone assembly 88 compromises a microphone chip 44 having a membrane 46, a transparent substrate 42, a spacer 90 and a base 92 having an ASIC chip 72 disposed thereon. The spacer 90 comprises a central hollow 94 to provide space for a VCSEL 48 and photo detectors 50. The VCSEL 48 and photo detectors 50 are affixed to a surface of the base 92, and the spacer 90 is positioned on the base 92 such that the VCSEL 48 and photo detectors are positioned in the central hollow 94. The substrate 42 is positioned on top of the spacer 90 such that the VCSEL 48 and photo detectors 50 are sealed within the central hollow 94, thus protecting the VCSEL 48 and photo detectors 50 from dust and other contaminants. The microphone chip 44 is positioned on top of the substrate 42 so as to form an interstitial volume 58 between the microphone chip 44 and the substrate 42. The substrate compromises an upper surface 60 having optical elements disposed thereon similar to those described previously with respect to FIGS. 1 and 2. An enclosure 74 is positioned over the base 92 so as to enclose the spacer 90, the substrate 42, the microphone chip 44 and the ASIC chip 72 therein. The enclosure 74 defines an acoustic cavity 76 in direct communication with the upper surface of the membrane 46. As explained with reference to FIG. 2, the large size of the acoustic cavity 76 means that when the membrane 46 vibrates in response to an acoustic wave, the increase in effective membrane stiffness is very small.

The substrate 42, the spacer 90, and the base 92 have respective sets of air channels 78, 96, and 98. The air channels 78, 96, 98 are substantially aligned such that together the air channels provide a passage for air between the interstitial volume 58 and the exterior of the optical microphone assembly 80. The optical microphone operates in a similar manner described above with reference to FIG. 2, namely when an oncoming acoustic wave impinges on the optical microphone assembly 88, it propagates along the air passages 98, 96, 78 and impinges on the membrane 46, causing the membrane 46 to vibrate. This vibration is measured using the VCSEL 48 and photo detectors 50 as controlled by the ASIC chip 72.

It can also be seen that, like the substrate of FIG. 2, the substrate 42 is thick and therefore rigid, substantially reducing any degradation in the optical microphone readout and thus the sensitivity, as discussed above with reference to FIG. 2.

Figure 9:
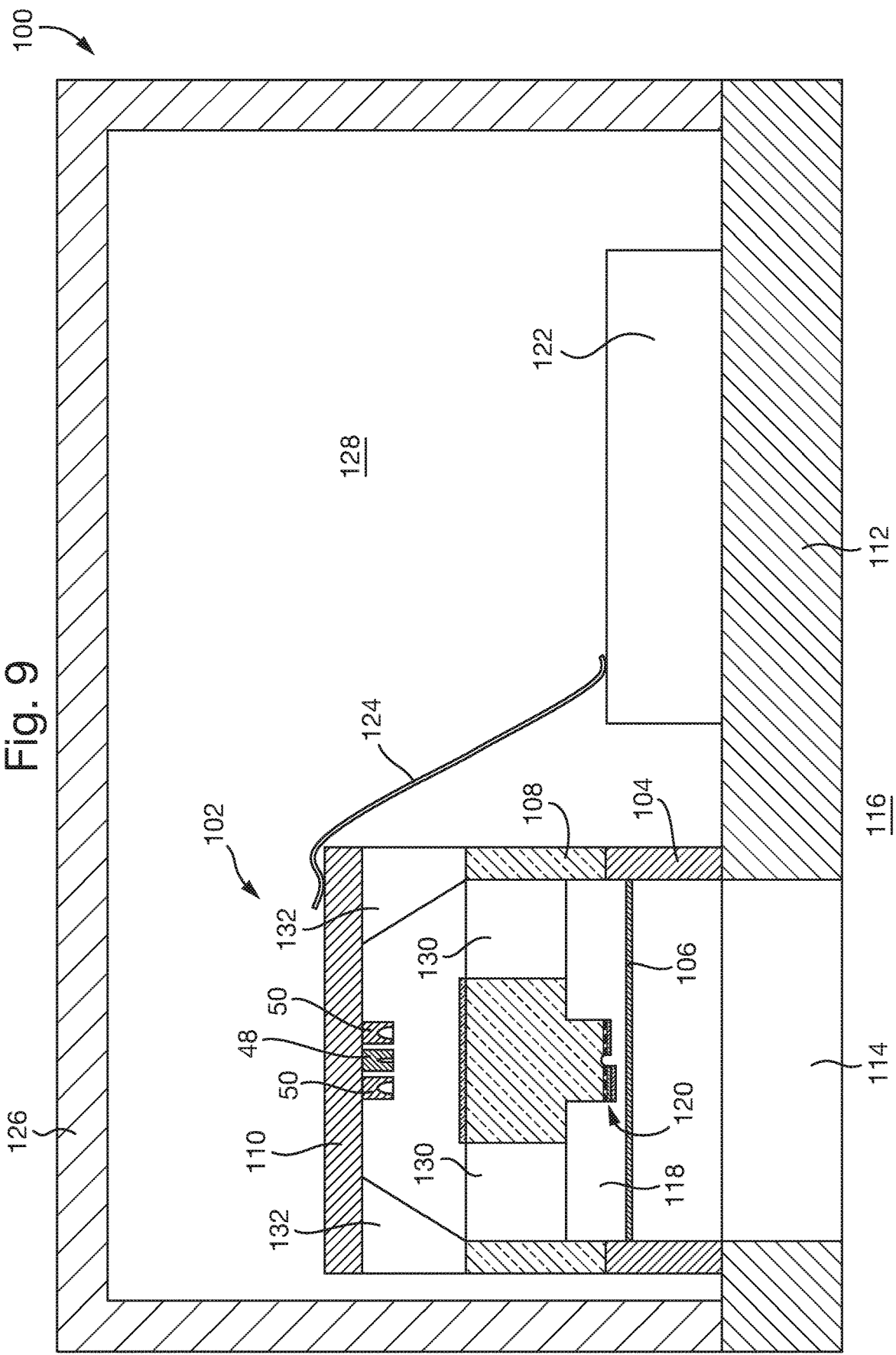
FIG. 9 shows a third embodiment of an optical microphone assembly in accordance with the present invention.

FIG. 9 shows a third embodiment of an optical microphone assembly 100 in accordance with the present invention. The optical microphone assembly 100 comprises an optical microphone 102, which comprises: a microphone chip 104 including a membrane 106; a transparent substrate 108; and an optical readout module 110. The assembly 100 also includes a base 112. An enclosure 126 is sealed onto the base 112, defining an acoustic cavity 128. The acoustic cavity 128 is large, and provides the same advantages as the acoustic cavity 76 discussed above with reference to FIGS. 2 and 8.

The optical microphone 102 is arranged in an inverted position, i.e. upside down, compared with the optical microphones in the embodiments of FIGS. 2 and 8. The microphone chip 104 is positioned on the base 112, and an acoustic port 114 (i.e. a wide aperture having, e.g., a cross-section matching the shape and dimensions of the membrane) is provided in the base 112 to allow air from the exterior 116 of the microphone assembly 100 to impinge on the membrane 106. The substrate 108 is positioned on top of the microphone chip 104 so as to define an interstitial volume 118 between the substrate 108 and the membrane 106. The optical readout module 110, having a VCSEL 48 and photo detectors 50 mounted thereon, is positioned on top of the substrate 108.

In use, radiation from the VCSEL 48 is directed through the transparent substrate 108. A first portion is reflected and diffracted by optical elements (similar to those described in FIG. 2) on a lower surface 120 of the substrate. The first portion then impinges on the photo detectors 50. A second portion of the radiation is transmitted through the optical elements and reflects from the membrane 106 back through the substrate 108 to the photo detectors 50. The two portions interfere, producing a resultant intensity at the photo detectors 50 that depends on the membrane displacement. The readout from the optical microphone 102 is carried out by an ASIC chip 122 connected to the optical readout module 102 via connections 124 (e.g. wire-bonding) in the same manner as discussed above with reference to FIG. 2.

In contrast with the embodiments of FIGS. 2 and 8, the air at the exterior 116 of the microphone is in direct fluid communication with the membrane 106 due to inverted orientation of the optical microphone 102 and the presence of the acoustic port 114. The side of the membrane 106 facing towards the substrate 108 is in indirect fluid communication with the acoustic cavity 128 via air channels 130, 132 provided in the substrate 108 and optical readout module 110 respectively. Alternatively, rather than providing the optical readout module 110 with air channels, the module 110 may simply have a shape that does not impede the flow of air through the substrate 108 into the acoustic cavity 128.

Figure 10:
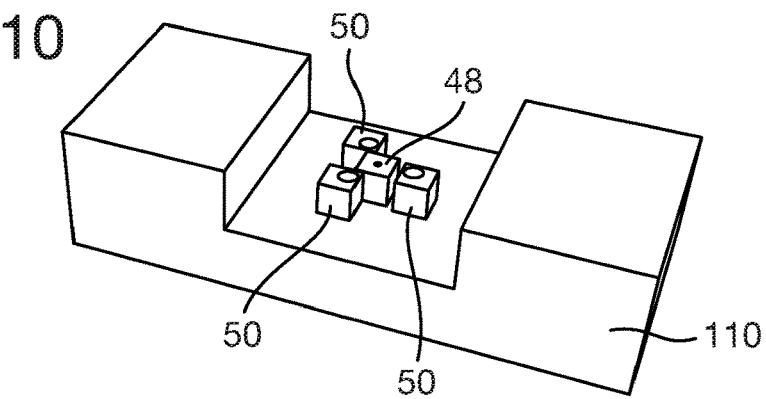
FIG. 10 shows a perspective view of the optical readout module of the embodiment of FIG. 9.
Figure 11:
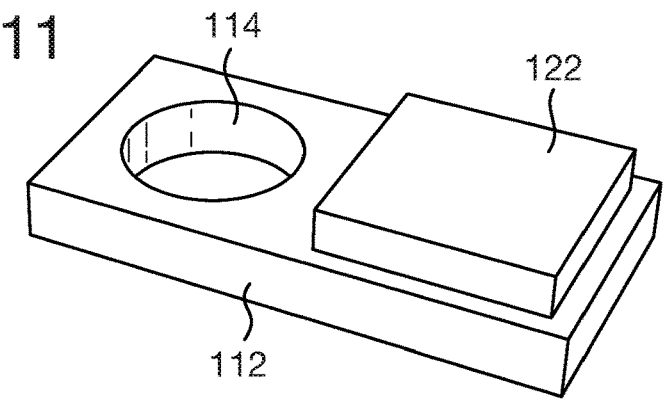
FIG. 11 shows a perspective view of the base of the embodiment of FIG. 9.
Figure 12:
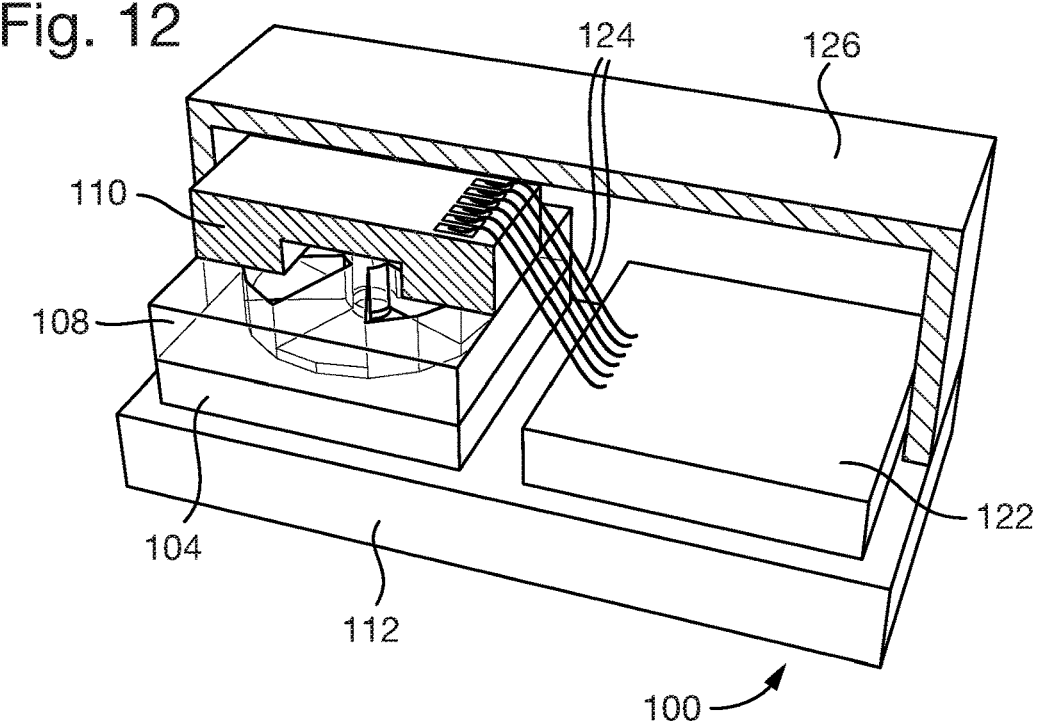
FIG. 12 shows a cut-away perspective view of the optical microphone assembly of FIG. 8.

FIGS. 10 to 12 show perspective views of the optical readout module 110, the base 112, and the optical microphone assembly 100 of FIG. 9. In FIG. 12, the enclosure 126 is shown partly cut away to allow the components therein to be seen.

Figure 13:
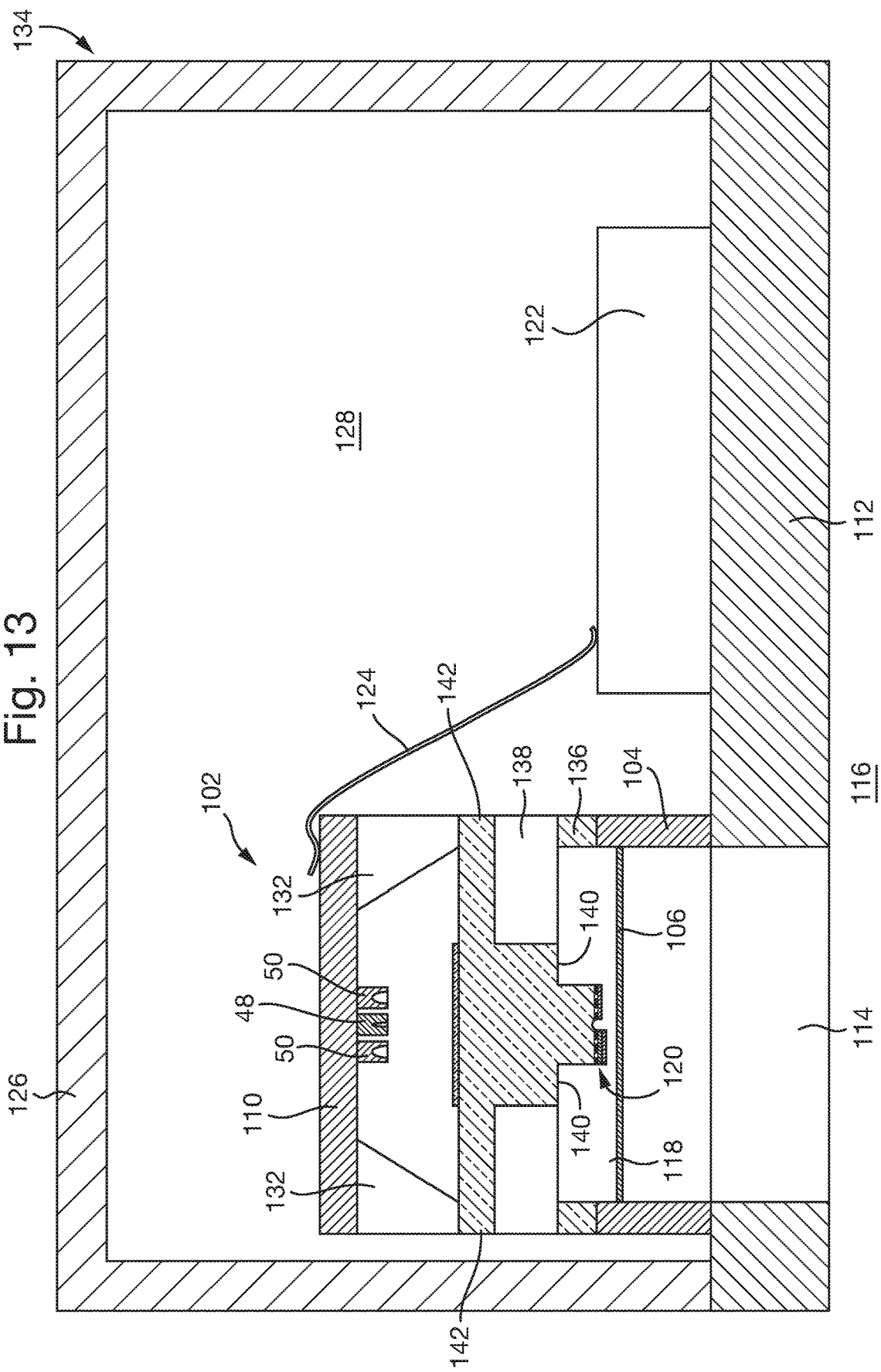
FIG. 13 shows a fourth embodiment of an optical microphone assembly in accordance with the invention.

FIG. 13 shows a fourth embodiment of an optical microphone 134 assembly, which may be seen as a variation on the embodiment of FIG. 9. The optical microphone assembly 134 of FIG. 13 comprises the same components as the optical microphone assembly 100 of FIG. 9, except that a different substrate 136 is used. In the embodiment of FIG. 9, the air channels 130 in the substrate 108 joining the interstitial volume 118 and the acoustic cavity 128 are shaped so that they pass straight through the substrate from front to back. In contrast, in the embodiment of FIG. 13, the substrate 136 is provided with air channels 138 that provide a channel between a lower surface 140 of the substrate and a side surface 142 of the substrate. It can be seen that such a shape of air channel puts the interstitial volume 118 in fluid communication with the acoustic cavity 128. Other shapes and positions of air channels connecting the interstitial volume 118 and acoustic cavity 128 are also possible.

Figure 14:
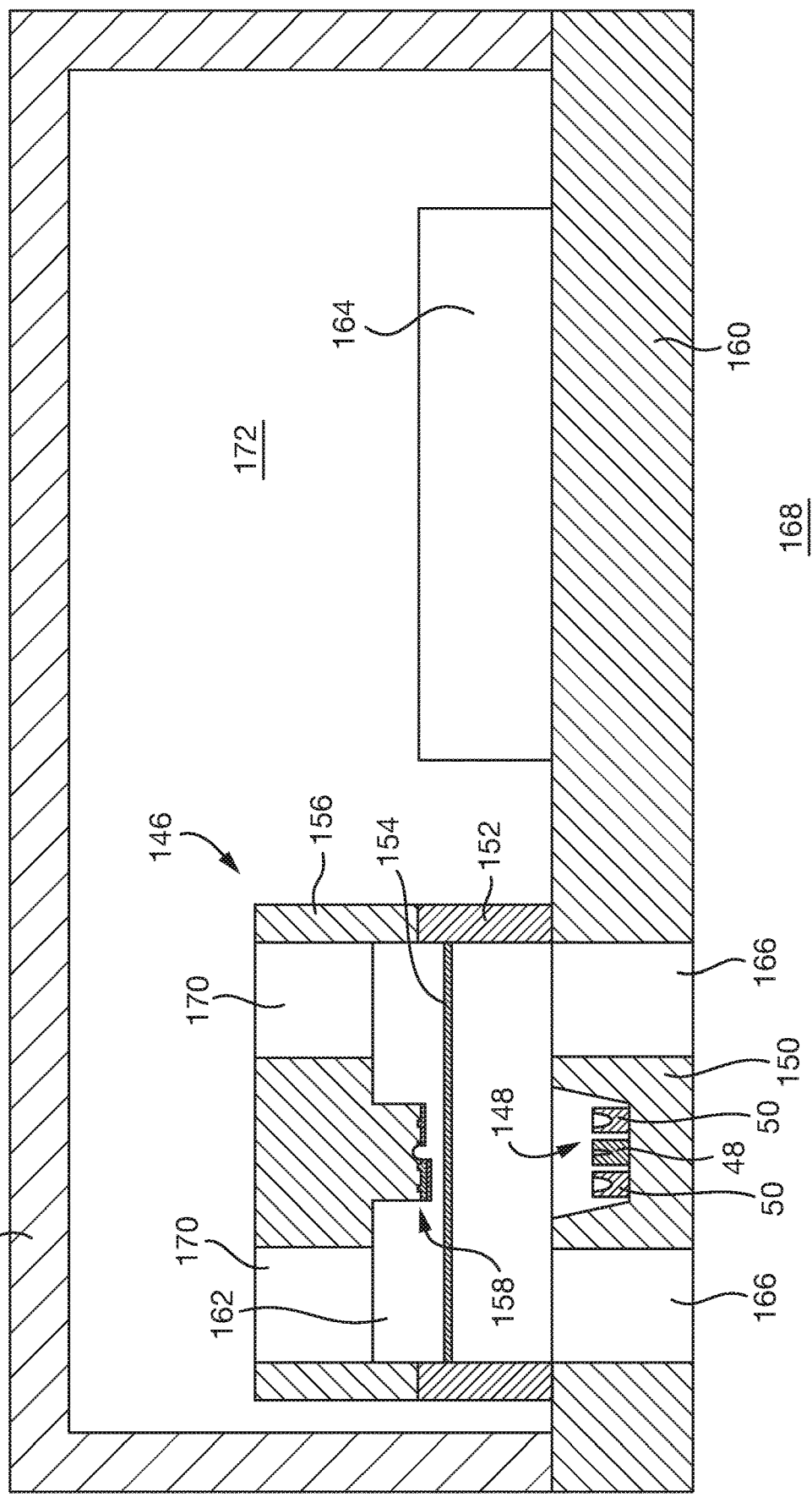
FIG. 14 shows a fifth embodiment of an optical microphone assembly in accordance with the present invention.

FIG. 14 shows a fifth embodiment of an optical microphone assembly 144 in accordance with the present invention. The order of the components of the optical microphone 146 is different from the other embodiments described above. In this embodiment, the substrate and optical readout module are on opposite sides of the membrane so that the VCSEL radiation impinges on the side of the membrane facing away from the substrate.

The optical microphone 146 comprises a VCSEL 48 and photo detectors 50 positioned in a recess 148 in an optical readout module 150 in a similar arrangement to that shown in FIG. 2. A microphone chip 152 having a membrane 154 and a substrate 156 having optical elements on a lower surface 158 thereof are positioned in an inverted arrangement compared with that of FIG. 2. The microphone chip 152 is positioned directly on a base 160 (which comprises the optical readout module 150). The substrate 156 is positioned on top of the microphone chip 156 and membrane 154 to define an interstitial volume 162 therebetween.

As noted above, in this embodiment, the VCSEL 48 illuminates the membrane 154 on the side facing away from the substrate. Consequently, neither of the first or second portions of radiation passes through the substrate prior to being reflected from the membrane 154 or membrane surface 158. Instead, a first portion of radiation from the VCSEL 48 is reflected from the membrane 154 onto the photo detectors 50, while a second portion is transmitted through the membrane 154 and is reflected from the optical elements on the lower surface 158 of the substrate back through the membrane and onto the photo detectors 50. It will be appreciated that the resultant intensity of the interference of the two portions of radiation at the photo detectors 50 will depend on the separation between the membrane 154 and the lower surface 158, similarly to the previously described embodiments. Accordingly, readout is carried out in the same manner by an ASIC chip 164 on the base 160.

Air channels 166 are provided through the base 160 to allow acoustic waves at the exterior 168 of the microphone to propagate through the air channels 166 to impinge on the membrane 154.

Air channels 170 are provided through the substrate to connect the interstitial volume 162 with an acoustic cavity 172 defined by an enclosure 174. The enclosure 174 is positioned over the optical microphone 146 and sealed to the base 160. In such embodiments in which neither portion of radiation passes through the substrate, the substrate need not necessarily be transmissive to the radiation emitted by the VCSEL 48.

Figure 15:
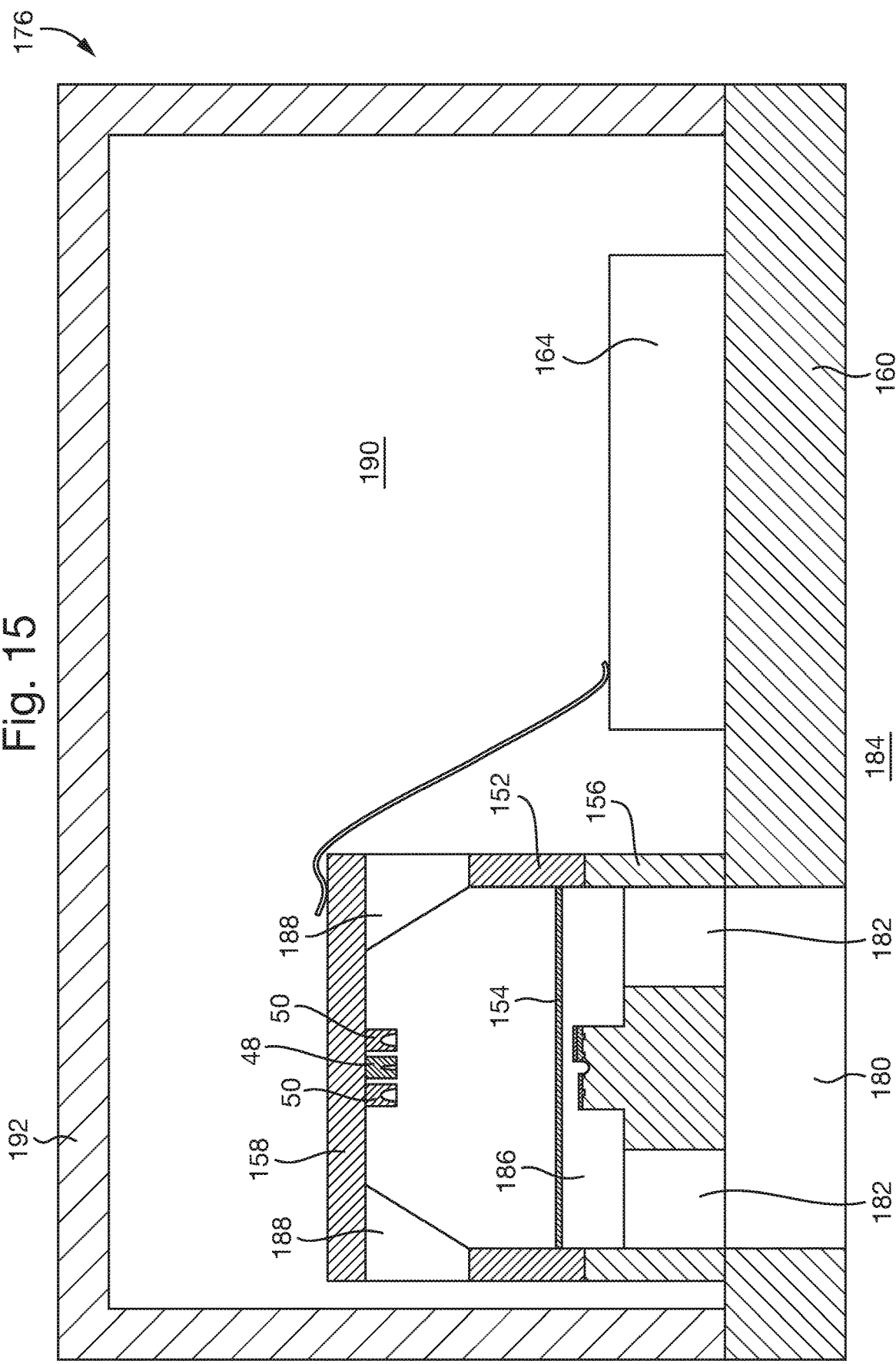
FIG. 15 shows a sixth embodiment of an optical microphone assembly in accordance with the present invention.

FIG. 15 shows an sixth embodiment having a similar microphone configuration to FIG. 14. The VCSEL and substrate are on opposite sides of the membrane, like in FIG. 14, but the optical microphone is inverted.

The optical microphone assembly 176 of FIG. 15 comprises a base 178 having an acoustic port 180 therethrough. Positioned over the acoustic port 180 is a substrate 156 that is similar to the substrate of FIG. 14. Positioned over the substrate is a microphone chip 152, having a membrane 154, that is similar to the microphone chip of FIG. 14. Positioned over the microphone chip 152 is an optical readout module 158 having a VCSEL 48 and photo detectors 50 affixed thereto. The relative positions of the substrate 156, the microphone chip 152 and the optical readout module 158 is equivalent (although inverted) to the configuration of FIG. 14, and thus operates in an equivalent manner.

In the embodiment of FIG. 15, air channels 182 in the substrate 156 provide an air passage through the substrate such that air at the exterior 184 of the microphone is in fluid communication with an interstitial cavity 186 defined between the membrane 154 and the substrate 156. Air channels 188 in the optical readout module 158 provide a passage for air so that the air in an acoustic cavity 190 defined by an enclosure 192 is in fluid communication with the side of the membrane 154 facing away from the substrate 156. It will therefore be appreciated that the acoustic cavity 190 provides a "back volume" in a similar manner to that described with reference to previous embodiments. As the acoustic cavity is large, it provides the same advantages to as described with reference to the other embodiments.

Figure 16:
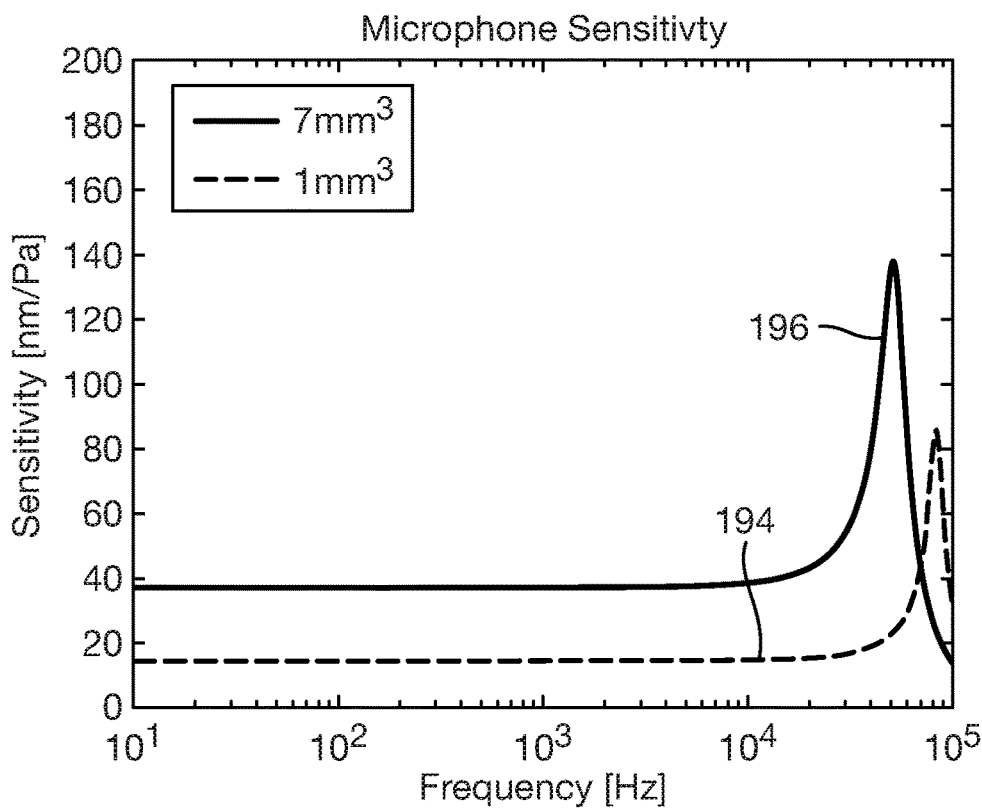
FIG. 16 is a graph showing the effect of a larger cavity on the microphone sensitivity.

As discussed above, the Applicant has found that, particularly for high compliance membranes, providing a large acoustic cavity advantageously increases the maximum displacement of the membrane that can be achieved for a given compliance. FIG. 16 is a graph showing the effect of a larger cavity on the microphone sensitivity (i.e. the effective membrane compliance).

The microphone sensitivity shown in FIG. 16 is modelled for an optical microphone assembly having the following parameters (although a similar effect is seen for other parameters):

Membrane diameter (d): 1 mm
Membrane compliance: 50 nm/Pa
Acoustic cavity size: 1 mm$^3$ and 7 mm$^3$ A 7 mm$^3$ cavity has a volume greater than 3 mm times d$^2$, so the assembly modelled as having a 7 mm$^3$ cavity is a model of an assembly in accordance with the invention. This example also meets each of the preferred criteria of: the cavity volume being at least 7 mm times d$^2$; the cavity volume being at least twice d$^3$; and the ratio of the volume of the acoustic cavity to the membrane compliance being at least 10 mm$^3$:100 nm/Pa. A 1 mm$^3$ cavity has a volume less than 3 mm times d$^2$, so the assembly modelled as having a 1 mm$^3$ cavity is an example of the sensitivity achieved without the benefit of the present invention.

In FIG. 16, the lower line 194 is the microphone sensitivity for the assembly with a cavity of 1 mm$^3$. The upper line 196 is the microphone sensitivity for the assembly with a cavity of 7 mm$^3$ (with all other parameters the unchanged). It can be seen that with the larger cavity, the effective membrane compliance is approximately 75% of the membrane's actual compliance. In contrast, without the larger cavity, the effective compliance is significantly suppressed.

Figure 17:
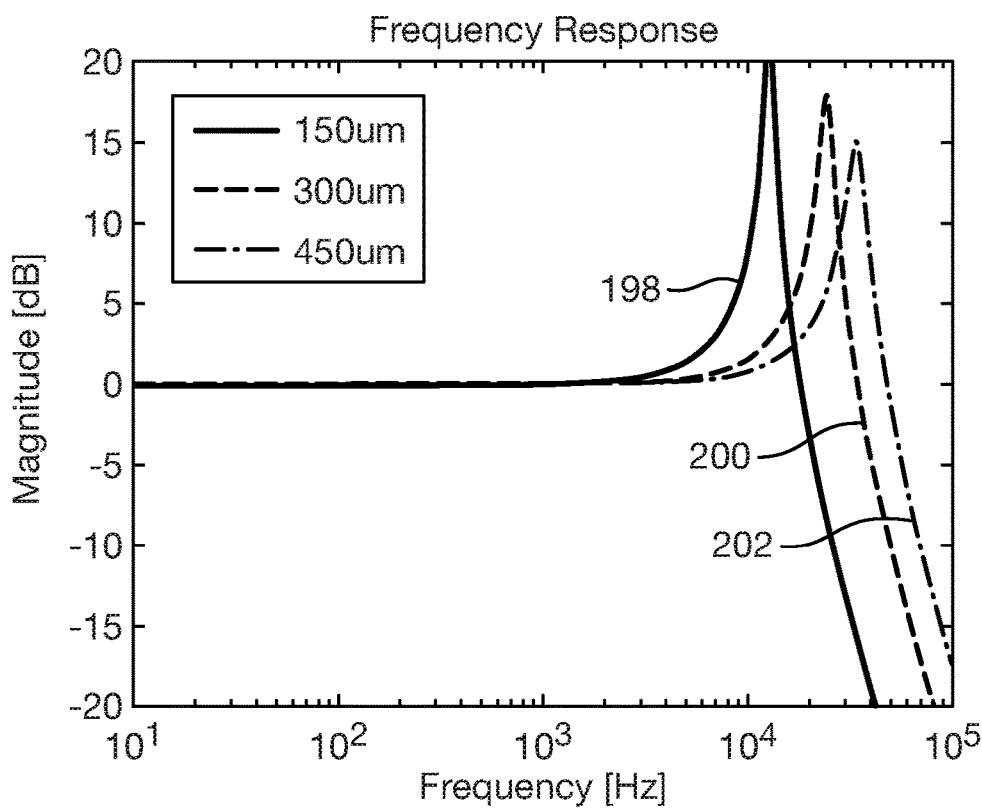
FIG. 17 is a graph showing improved frequency responses for optical microphone assemblies having large air channels.

As also discussed above, the Applicant has found that providing air channels having a large size can advantageously improve the frequency response of the microphone. FIG. 17 shows a computational simulation of the improved frequency response for two example optical microphone assemblies having large air channels, compared with the same assembly having smaller air channels.

The frequency response shown in FIG. 17 is modelled for an optical microphone assembly having the following parameters (although a similar effect is seen for other parameters):

Membrane diameter: 1 mm
Membrane compliance: 50 nm/Pa
Substrate thickness (air channel length): 700 μm
Air channel shape: circular
Air channel diameter: 150 μm, 300 μm and 450 μm
Acoustic cavity size: 7 mm$^3$ In this example, the substrate is 700 μm thick, and is modelled as having straight channels therethrough, so that the channels are 700 μm long. The air channels diameters therefore represent: a size much less than the air channel length/substrate thickness (150 μm); a size almost half the air channel length/substrate thickness (300 μm); and a size over half the air channel length/substrate thickness (450 μm), the latter being the preferred range of embodiments of the invention.

The substrate may be thinner in accordance with the invention, e.g. 10 μm, so it will be appreciated that the channels of this example are relatively long compared with some other embodiments. The air channel diameter may be greater than the air channel length in this and other embodiments, but this is not shown in this particular modelled example.

FIG. 17 shows a first line 198, which is the frequency response for the air channel diameter of 150 μm. It can be seen that there is a resonance peak in the frequency response at around 13 kHz, resulting in significant frequency distortion from around 7 kHz upwards.

A second line 200 shows the frequency response for the air channel diameter of 300 μm, and a third line 202 shows the frequency response for the air channel diameter of 450 μm. It can be seen that the larger channels shift the resonance peak to higher frequencies, and a larger shift is seen at the largest channel diameter (about 25 kHz peak for 300 μm diameter compared with about 34 kHz peak for 450 μm diameter). Both of these peaks are in the ultrasonic range, which is advantageous for audio applications.

Figure 18:
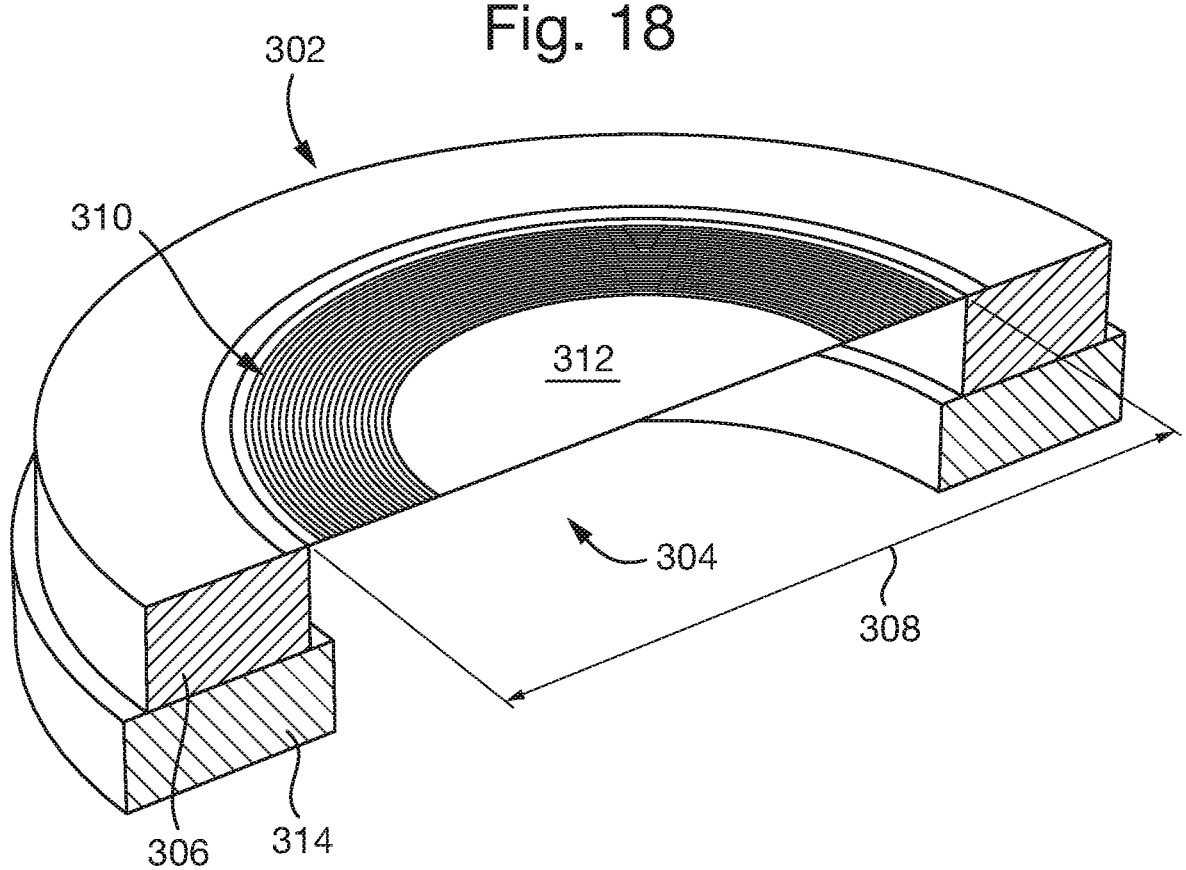
FIG. 18 shows a partly cut away perspective view of a membrane and mount for use in an embodiment of the present invention.

FIG. 18 shows a partially cut away perspective view of a membrane component 302 for an optical microphone assembly in accordance with an embodiment of the present invention which exhibits reduced in-plane tension and so higher compliance. The membrane component 302 comprises a membrane 304 and a support 306. The membrane component 302 is circular, i.e. the portion that is not shown is a mirror image of the portion that is shown, and the cross section visible in FIG. 18 is along a plane of symmetry. The diameter 308 of the membrane 304 is 3 mm. The membrane 304 is made from silicon nitride ($Si_3N_4$).

Near the periphery of the membrane 304, there is a plurality of concentric circular corrugations 310. A central portion 312 of the membrane 304 does not have any corrugations and is planar so that it will reflect light. The support 306 is made from silicon, and is formed from a portion of a silicon wafer onto which the silicon nitride membrane 304 was deposited during manufacture of the membrane component 302, as discussed further below with reference to FIGS. 24(a)-(c). The silicon support 306 is mounted on a glass substrate 314.

Figure 19:
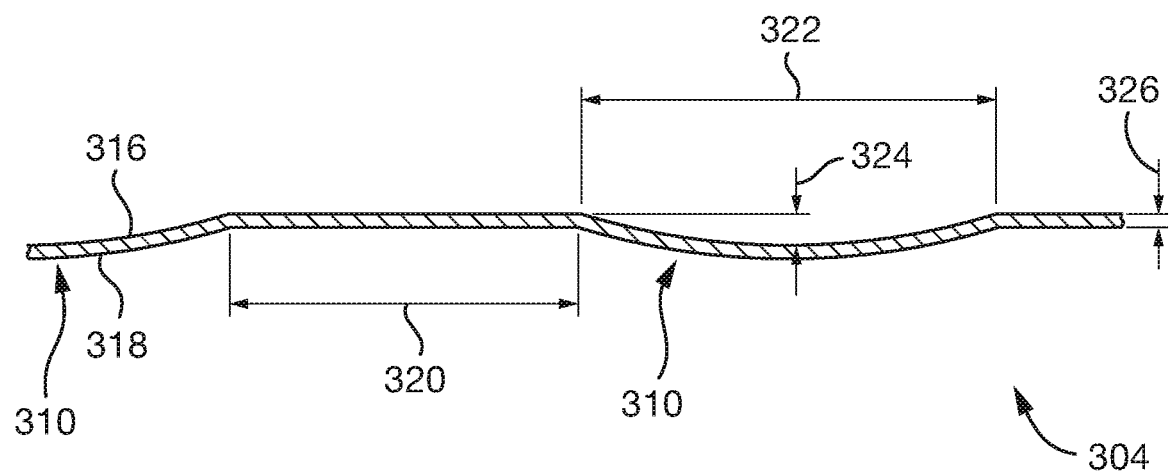
FIG. 19 shows a cross-sectional view of a portion of the corrugated region of the membrane shown in FIG. 18.

FIG. 19 shows a cross sectional view of the membrane 304 of FIG. 18, showing the shape and dimension of the corrugations 310 (not to scale). When viewed from above, i.e. looking at the upper surface 316 of the membrane 304, the corrugations 310 are formed as concave curved indentations in the membrane 304. Viewed from below, i.e. looking at the lower surface 318, the corrugations appear as convex shaped ridges. It will be appreciated that it is not necessary for the corrugations to have the exact shape depicted in FIG. 19. The benefits of the corrugations resulting from the decrease in in-plane tension in the membrane can be achieved with differently shaped corrugations. In FIGS. 18 and 19, the exemplary pitch 320 of the corrugations 310 (i.e. the distance between the corrugations 310) is 10 μm). The exemplary width 322 of the corrugations is 15 μm. The exemplary depth 324 of the corrugations is 1400 nm. The exemplary thickness 326 of the membrane is 100 nm.

Figure 20:
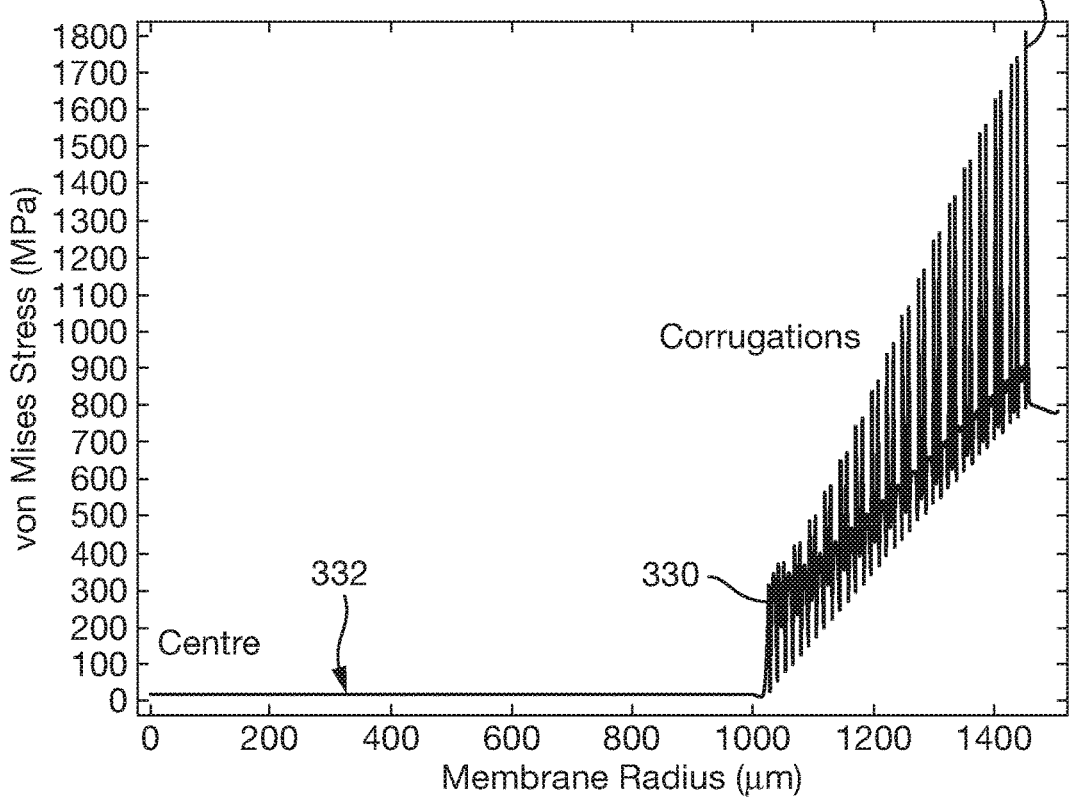
FIG. 20 is a graph of the variation in von Mises stress from the centre of a membrane to the periphery of the membrane calculated for a membrane that may be used in embodiments of the present invention.

FIG. 20 shows a graph of the radial distribution of the von Mises stress calculated using a finite element method (FEM) computational model of a circular silicon nitride membrane with 17 corrugations. The von Mises stress is used herein to express the stress in the membrane, which is a vector, as a scalar quantity. At the far right of the graph, there is a high stress which corresponds to the periphery of the membrane. The elongation of the membrane due to the corrugations creates successive high tensile (pitch and valley) and compressive (corners) stresses, as seen in the graph. The first corrugation 328 shows a high local stress of approximately 1800 MPa. The rapid variation in the stress with the radius corresponds to the change in stress between the pitch and valley regions, and the corners between these regions. It can be seen that the maximum stress for each corrugation decreases with decreasing radius (i.e. towards the centre of the membrane), and also that the difference between the stress at the pitch and valley regions and at the corners reduces as towards the centre, i.e. the stress becomes more distributed towards the centre.

The peak in the von Mises stress at the last corrugation 330 (i.e. the innermost corrugation) is the lowest peak. Thereafter, within the planar central portion 332 of the membrane, the von Mises stress is flat and at a low value of approximately 17 MPa. This intrinsic stress results in a compliance of approximately 200 nm/Pa. In contrast, a flat silicon nitride membrane having the same dimensions as the FEM model membrane of FIG. 20, but without corrugations, the intrinsic tensile stress is typically 2 to 3 orders of magnitude higher, resulting in a very low compliance (e.g. around 5 nm/Pa).

Figure 21:
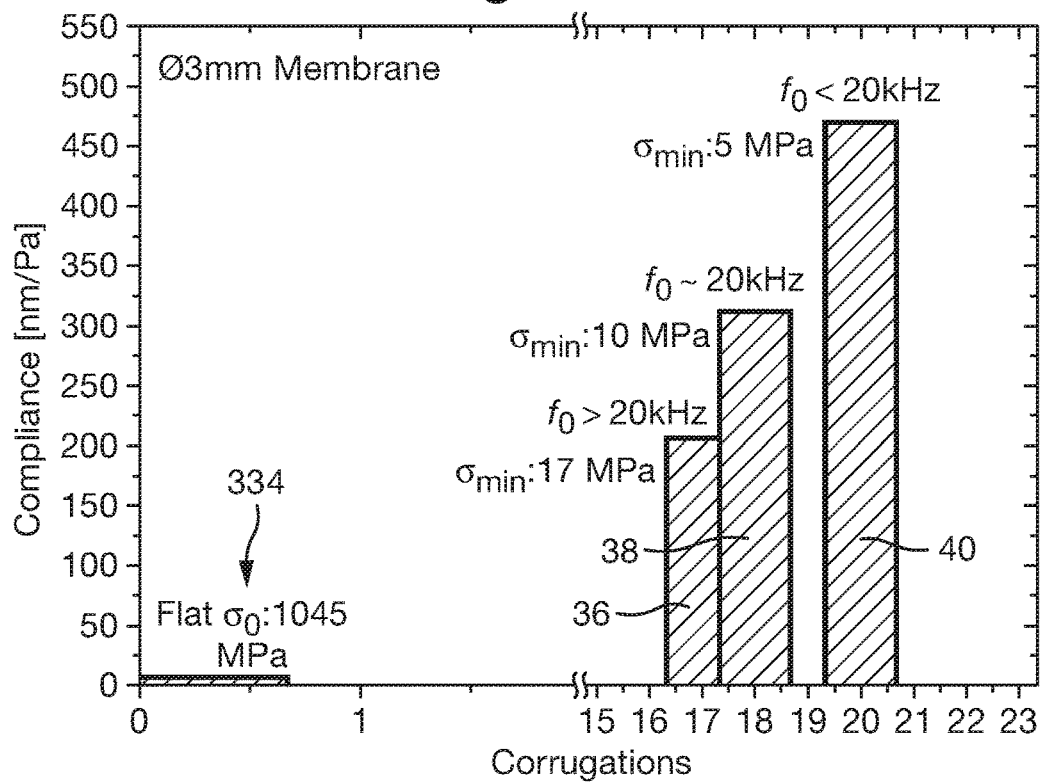
FIG. 21 is a graph of the compliance calculated for membranes with different numbers of corrugations compared with a flat membrane.

FIG. 21 shows a graph of the relationship between compliance and the number of corrugations provided in a 3 mm silicon nitride membrane, calculated using a FEM computational model. The compliance for a flat 3 mm silicon nitride membrane (i.e. zero corrugations) is shown by the first bar 334 and is approximately 5 nm/Pa, which corresponds to an intrinsic tensile stress of 1045 MPa. The compliance values for membranes with 17 corrugations, 18 corrugations, and 20 corrugations are shown by bars 336, 338, and 340 respectively. Adjacent to each compliance bar 334, 336, 338, 340 is noted the tensile stress in the centre region for each of these membranes, as well as the resonant frequency $f_0$ for each membrane. It is desirable to have a resonant frequency $f_0$ above 20 kHz. It can be seen that for 17 corrugations, $f_0$ is greater than 20 kHz; for 18 corrugations, $f_0$ is approximately 20 kHz; and for 20 corrugations, $f_0$ is below 20 kHz. To achieve the maximum compliance while keeping a resonant frequency $f_0$ above 20 kHz for the 3 mm membrane modelled for FIG. 21, 17 corrugations is therefore optimal. It will be appreciated that a different number of corrugations may be optimal for a membrane of different materials or dimensions.

Figure 22:
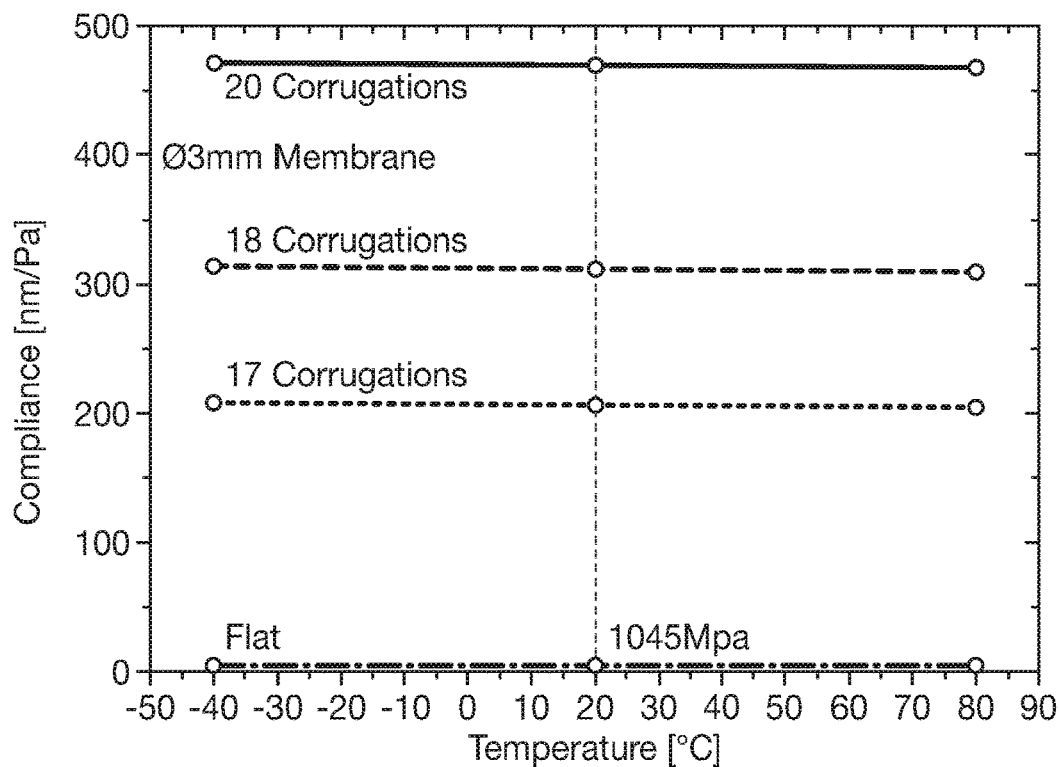
FIG. 22 shows the variation of the compliance with temperature calculated for membranes having different numbers of corrugations compared with a flat membrane.
Figure 23:
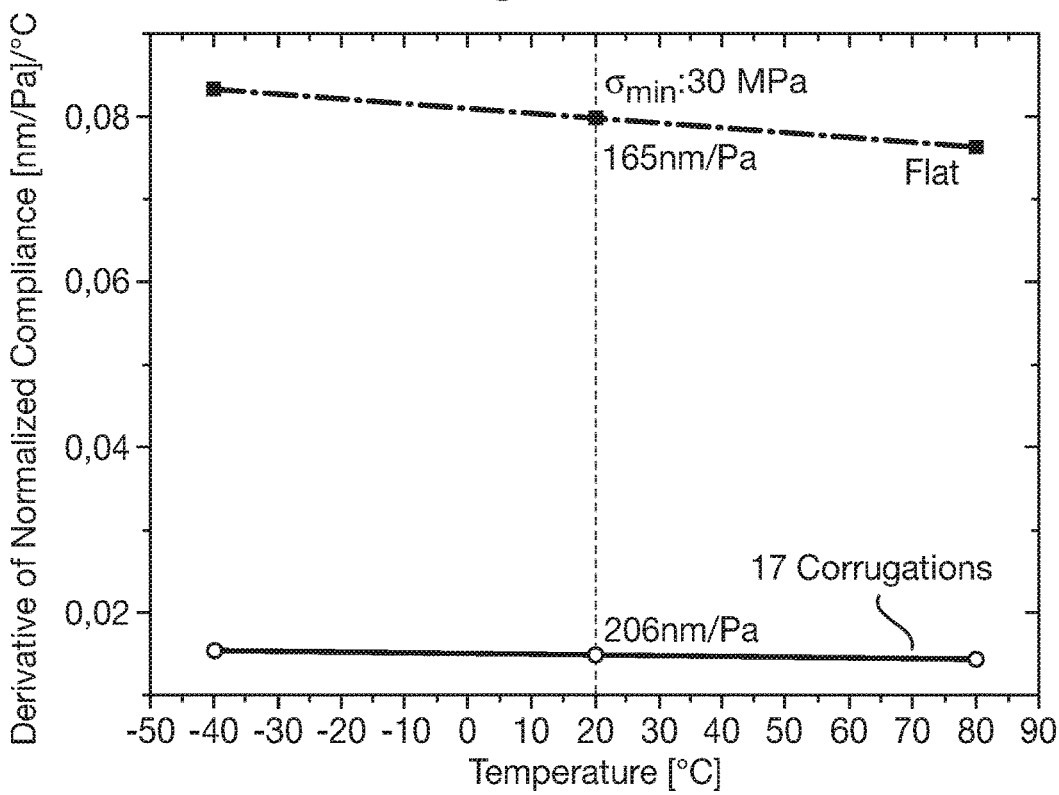
FIG. 23 shows the variation in thermal sensitivity of a flat membrane compared with a corrugated membrane.

FIG. 22 shows the variation of the compliance with temperature for 3 mm flat and corrugated membranes, calculated using a FEM computational model. Thermal stability of the membrane compliance is important to ensure that a variation in temperature when the optical microphone is operating will not affect the performance of the microphone. It can be seen that the compliance for all three corrugated membranes (17, 18 and 20 corrugations) is substantially flat across the range of −40° C. to 80° C. This can also be seen in FIG. 23, which shows the derivative of the normalised compliance with respect to temperature for a flat membrane and a corrugated membrane with 17 corrugations. It can be seen that the variation in compliance with temperature is approximately 0.01%/° C. for the corrugated membrane, whilst the flat membrane the variation is significantly higher, at 0.08%/° C. This difference is attributed to the corrugations and outer portion of the membrane acting as a stress buffer compensating, at least in part, for any extra variation originating from the thermal loads. The computation used to calculate the temperature variations shown in FIGS. 22 and 23 was carried out for a geometry equivalent to that shown in FIG. 18, which includes the silicon support and glass substrate.

FIGS. 24(*a*) to 24(*h*) show an example method for fabricating a corrugated membrane for use in an optical microphone assembly in accordance with the present invention.

FIG. 24(*a*) shows a silicon wafer 342 with indentations 344, which conform to the desired shape of the corrugations, etched into the bottom of the silicon wafer 342. The silicon wafer 342 is shown in cross-section, and when viewed from the bottom, the indentations 344 have the form of two concentric rings. The indentations 344 are approximately 1000 nm deep and are created in the silicon wafer using reactive ion etching (RIE), although other methods may be used instead, e.g. material deposition, patterning/lithography, etc.

FIG. 24(*b*) shows the silicon wafer 342 with the silicon surface oxidised to provide an upper 346 and lower 348 silicon oxide layer. The oxidation may be achieved by any suitable method, e.g. thermal oxidation. The silicon oxide layer is approximately 500 nm thick. As can be seen in FIG. 24(*b*), the lower silicon oxide layer 348 follows the shape of the indentations 344.

As shown in FIG. 24(*c*), after the surface is oxidised, an upper 350 and lower 352 silicon nitride ($Si_3N_4$) layer is deposited over the silicon oxide layers 346, 348 via low pressure chemical vapour deposition (LPCVD). The lower silicon nitride layer 352 also follows the shape indentations 344.

As shown in FIG. 24(*d*), the silicon nitride layer is then selectively removed by etching, leaving a region corresponding to the final desired membrane. Selective etching can be achieved using known methods, e.g. masking.

As shown in FIG. 24(*e*), a mask 356 is applied to isolate a region 358 of the silicon wafer 342 adjacent the back of the membrane so that the region 358 can be etched away. As shown in FIG. 24(*f*), the silicon oxide and silicon wafer exposed by region 358 are etched away using reactive ion etching. As shown in FIG. 24(*g*), the mask is then removed. Finally, as shown in FIG. 24(*h*), wet etching is used to remove the silicon oxide on the back of the membrane, leaving the silicon nitride membrane 360 with corrugations 362, corresponding to the indentations 344, supported in the gap 364 of the silicon wafer 342.

FIGS. 25(*a*) to 25(*c*) show schematically an example of an optical microphone 364 for an optical microphone assembly in accordance with the present invention to illustrate the readout technique.

Each of FIGS. 25(*a*) to 25(*c*) show an optical microphone 364, comprising a membrane 366, supported by a silicon support 368, which is mounted on a spacer 370. The spacer is mounted on a rigid substrate 371 provided with air passages 372. The enclosure is omitted from these Figures for clarity. The optical microphone 364 also comprises a light source 373, a first detector 374 and a second detector 376. A first diffraction grating 378 and a second diffraction grating 380 are positioned between the membrane 366 and the light source 373. The first diffraction grating 378 is positioned slightly closer to the membrane 366 than the second diffraction grating 380. Each grating 378, 380 together with the membrane 366 forms an interferometric arrangement.

When the optical microphone 364 is operating, the light source 373 generates radiation 382, which is directed onto the first and second diffraction gratings, 378, 380. Of the radiation that impinges on the first diffraction grating 378, a first portion passes through the first diffraction grating 378 and is diffracted. This diffracted radiation is then reflected by the membrane 366 onto the first detector 374 via the first diffraction grating 378. A second portion is reflected by the first diffraction grating 378 onto the first detector 374. The second portion interferes with the first portion to form an interference pattern, and consequently the intensity of light detected at the detector 374 depends on the interference pattern, and therefore on the distance between the first grating 378 and the membrane 366.

Similarly, of the radiation that impinges on the second diffraction grating 380, a first portion passes through the second diffraction grating 380 and is diffracted. This diffracted radiation is then reflected by the membrane 366 onto the second detector 376 via the second diffraction grating 380. A second portion is reflected by the second diffraction grating 380 onto the second detector 376. The second portion interferes with the first portion to form an interference pattern, and consequently the intensity of light detected at the detector 376 depends on the interference pattern, and therefore on the distance between the second grating 380 and the membrane 366.

As the intensity of the light at each of the detectors 374, 376 depends on the distance between the respective diffraction grating 378, 380 and the membrane 376, the position (and thus the motion) of the membrane can be inferred from the detected intensities.

FIG. 26 shows the relative diffraction efficiency of the interfering transmitted and reflected portions of light. For each grating 378, 380, the respective detector 374, 376 is positioned to receive the zeroth order diffraction peak. The first or a higher order peak could be detected instead, or multiple detectors could be used to detect more than one peak, e.g. the zeroth and first order peaks. The first line 386 corresponds to the zeroth order peak. The second line 388 corresponds to the first order peak.

As shown in FIG. 26, the relative diffraction efficiency of the zeroth and first order peaks varies sinusoidally with distance between the membrane and grating, and the zeroth and first order peaks are in anti-phase. The sensitivity of the microphone is determined by the change in output signal for a given change in displacement of the membrane. It can be seen from FIG. 26 therefore that the maximum sensitivity occurs in the operating ranges 390 in which the lines 386, 388 have maximum gradient.

Accordingly, for each grating, the motion of the membrane may only be determined with high sensitivity in operating ranges 390 of approximately $\pm\lambda/16$ (corresponding to approximately $\pm 50$ nm membrane displacement) around working points corresponding to distance between the membrane and grating of $(2n+1)\lambda/8$, where n is an integer. At other distances, there are regions of low sensitivity 392. Consequently, the dynamic range that can be detected with one grating is limited. Therefore, in the optical microphone 364, the two gratings 378, 380 are provided at slightly different distances from the membrane to cover a greater range of membrane positions, thus extending the dynamic range of the optical microphone.

Referring back to FIG. 25(*b*), this shows the membrane 366 in its equilibrium position. The distance $d_1$ between the first diffraction grating 378 and the equilibrium position of the membrane 366 is slightly less than $\lambda/8$ (e.g. $\lambda/16$), while the distance $d_2$ between the second diffraction grating 380 and the equilibrium position of the membrane 366 is slightly more than $\lambda/8$ (e.g. $3\lambda/16$). When the membrane 366 is displaced from its equilibrium position away from the diffraction gratings 378, 380, as shown in FIG. 25(*a*), the distance between the membrane 366 and the first diffraction grating 378 is in the region of $\lambda/8$. This is within the operation range of the first diffraction grating 378, but in the range of low sensitivity range of the second diffraction grating 380. When the membrane 366 is displaced from its equilibrium position towards the diffraction gratings 378, 380, as shown in FIG. 25(*c*), the distance between the membrane 366 and the second diffraction grating 380 is approximately $\lambda/8$. This is within the operation range of the second diffraction grating, but in the low sensitivity range of the first diffraction grating 378.

The signals from the first and second detectors 374, 376 are then combined, e.g. at processor 384, to utilise the measurements taken in the operating ranges of each diffraction grating 378, 380. The combined signals cover a greater dynamic range than each signal does individually. This is illustrated in FIG. 27, which shows relative diffraction efficiency curves 394, 396 for two first order peaks detected at first and second detectors corresponding to respective first and second gratings in an optical microphone, where the gratings have a relative height offset of $\lambda/8$. The relative diffraction efficiencies are shown as a function of distance between the membrane of the optical microphone and the respective grating. The first line 394 corresponds to the first order peak detected at the first detector 374, and the second line 396 corresponds to the first order peak detected at the second detector 376. It can be seen that low sensitivity regions of the first detector (e.g. region 398) where intensity does not vary much with distance correspond to operating ranges (where the slope of the curve is steep) for the second detector, and vice versa (e.g region 400).

It will be appreciated that the present invention can be put into effect with only one diffraction grating (e.g. as described above, but only using the first diffraction grating position at $\lambda/8$ from the membrane). However, the invention can be used to particular advantage if the operation range is extended by using more than one grating (or other optical element) as described above, as the increased operation range may enable the use of particularly high compliance membranes in accordance with the invention. It will also be appreciated that more than two diffraction gratings at different distances could be used to increase the dynamic range further.

FIG. 28 shows a further optical microphone 402 for use in optical microphone assemblies in accordance with the invention. The optical microphone 402 comprises a membrane 404 having corrugations 406. The corrugations are formed in concentric rings around a central portion 408, which provides a first flat surface 410. The optical microphone also comprises a second flat surface 412, a light source 414 and a lens 416. The first and second flat surfaces 410, 412 define an interstitial volume 418 therebetween. The membrane 404 and the second flat surface 406 are partially reflective, so that the first and second surfaces 410, 412 together behave as a Fabry-Perot interferometric arrangement.

The lens 416 collimates light from the light source 414, and directs it onto the membrane 404. The light passes through the membrane 404 to enter the interstitial volume 418. The light is internally reflected inside the interstitial volume 418 between the first and second surfaces 410, 412 multiple times, and each time the light impinges on the second flat surface 412, a portion of the light is transmitted through the second flat surface to impinge on a detector 420. Each portion propagates along a different light path 422*a*, 422*b*. Although in FIG. 28 only two light paths 422*a*, 422*b* are shown, it will be appreciated that there may be more internal reflections giving more to more portions of light propagating along additional different light paths. It will be appreciated that although the light paths 422*a*, 422*b* are illustrated as being spatially separated for clarity, in practice they may be superimposed in the spatial domain.

The optical path difference between the light paths 422a, 422b depends on the distance d between the first flat surface 410 of the membrane 404 and the second flat surface 412, and so the intensity of radiation at the detector depends on distance d.

The intensity I of the radiation incident on the detector is $$I = I_0/(1+(2F/\pi)^2 \sin^2(2\pi d/\pi)),$$

where d is the distance between the first and second flat surfaces, F is the interferometer's finesse, and A is the wavelength of the light.

When the membrane moves in response to acoustic vibrations, the distance d varies, and the intensity of radiation incident on the detector changes. It is thus possible to calculate the spacing d from the light intensity I measured at the detector.

It can be seen that the second flat surface is an upper surface of a thick substrate 424. The thick substrate has air channels 426 therethrough. The optical microphone of FIG. 28 is suitable for incorporation in optical microphone assemblies in accordance with the invention as described above. Thus it will be appreciated that the air channels 426 may connect the interstitial volume 418 with an acoustic cavity of the optical microphone or with the exterior of the optical microphone in the manner described above in relation to the previous embodiments.

It will be appreciated that although the configuration in FIG. 28 of the interferometric arrangement incorporating the membrane differs from other embodiments, all of the previously described features relating to the optical microphone assembly, the membrane and (if present) its corrugations may also apply to embodiments incorporating the configuration of FIG. 28.

It will be appreciated that the embodiments described above are only examples, and that variations are possible within the scope of the invention.

The invention claimed is:

1. An optical microphone assembly comprising:
    a rigid substrate;
    an interferometric arrangement, the interferometric arrangement comprising a membrane and at least one optical element spaced from the membrane, wherein the at least one optical element comprises a surface of the substrate and/or is disposed on a surface of the substrate:
    a light source arranged to provide light to said interferometric arrangement such that a first portion of said light propagates along a first optical path via said interferometric arrangement and a second portion of said light propagates along a second optical path via said interferometric arrangement, the second optical path differing from the first optical path, thereby giving rise to an optical path difference between the first and second optical paths which depends on a distance between the membrane and the at least one optical element;
    at least one photo detector arranged to detect at least part of an interference pattern generated by said first and second portions of light dependent on said optical path difference; and
    an enclosure arranged to form an acoustic cavity in fluid communication with one side of the membrane; wherein the acoustic cavity has a volume which is at least 3 mm multiplied by $d^2$, where d is a diameter of the membrane.

2. The optical microphone assembly as claimed in claim 1, wherein at least the interferometric arrangement, the light source and the photo detector together define an optical microphone, wherein the optical microphone is a microelectromechanical system (MEMS) optical microphone.

3. The optical microphone assembly as claimed in claim 1, wherein the optical microphone assembly comprises an interstitial volume in addition to the acoustic cavity, wherein the substrate and membrane together define the interstitial volume therebetween.

4. The optical microphone assembly as claimed in claim 3, wherein the interstitial volume is less than 10% of the volume of the acoustic cavity.

5. The optical microphone assembly as claimed in claim 1, wherein the membrane and the optical element are integrated into a MEMS component.

6. The optical microphone assembly as claimed in claim 1, wherein the optical microphone assembly is manufactured using micro-electro-mechanical systems (MEMS) processes.

7. The optical microphone assembly as claimed in claim 1, wherein the membrane has a maximum lateral dimension in a range of between 1 mm and 4 mm.

8. The optical microphone assembly as claimed in claim 1, comprising one or more apertures providing a passage for air through the substrate.

9. The optical microphone assembly as claimed in claim 8, comprising a plurality of apertures surrounding a central support portion of the substrate, the at least one optical element being provided on the central support portion.

10. The optical microphone assembly as claimed in claim 8, wherein each aperture of the one or more apertures has a maximum extent in a plane of the substrate greater than or equal to a thickness of the substrate.

11. The optical microphone assembly as claimed in claim 1, wherein the substrate and the membrane together define an interstitial volume therebetween, and wherein the optical microphone assembly further comprises one or more apertures providing a passage for air so that the interstitial volume is in fluid communication with an exterior of the microphone assembly via the one or more apertures.

12. The optical microphone assembly as claimed in claim 11, wherein the enclosure is positioned to form the acoustic cavity on a side of the membrane facing away from the substrate.

13. The optical microphone assembly as claimed in claim 1, wherein the substrate and the membrane together define an interstitial volume therebetween, and wherein the optical microphone assembly further comprises one or more apertures providing a passage for air so that the acoustic cavity is in fluid communication with the interstitial volume via the one or more apertures.

14. The optical microphone assembly as claimed in claim 13, wherein the enclosure is positioned to form the acoustic cavity on a side of the membrane facing towards the substrate.

15. The optical microphone assembly as claimed in claim 1, comprising a through-hole in the substrate, the through-hole having substantially similar dimensions to the membrane and substantially overlapping the membrane, and further comprising a plurality of integrally formed radially extending support elements connecting a central support to the substrate around a perimeter of the through-hole, the at least one optical element being provided on the central support.

16. The optical microphone assembly as claimed in claim 1, wherein the membrane is formed with at least one corrugation to reduce in-plane tension therein.

17. The optical microphone assembly as claimed in claim 1, further comprising a mount having a recess, the light source and/or the photo detector being mounted in the recess, wherein the mount is sealed to the substrate to form a sealed cavity containing the light source and/or the photo detector.

18. The optical microphone assembly as claimed in claim 1, wherein at least one of the substrate and the membrane is at least partially transparent to radiation emitted by the light source.

19. The optical microphone assembly as claimed in claim 1, wherein the light source is positioned to illuminate the optical element such that the first portion of light passes through the optical element to the membrane to be reflected by the membrane and the second portion of light is reflected from the optical element.

20. The optical microphone assembly as claimed in claim 1, wherein the light source is positioned to illuminate the membrane such that the first portion of light passes through the membrane to the optical element to be reflected by the optical element and the second portion of light is reflected from the membrane.

21. A method of operating an optical microphone assembly, the optical microphone assembly comprising:
  a rigid substrate;
  an interferometric arrangement, the interferometric arrangement comprising a membrane and at least one optical element spaced from the membrane, wherein the at least one optical element comprises a surface of the substrate and/or is disposed on a surface of the substrate;
  a light source;
  at least one photo detector; and
  an enclosure arranged to form an acoustic cavity in fluid communication with one side of the membrane; wherein the acoustic cavity has a volume which is at least 3 mm multiplied by $d^2$, where d is a diameter of the membrane; the method comprising:
the light source providing light to said interferometric arrangement such that a first portion of said light propagates along a first optical path via said interferometric arrangement and a second portion of said light propagates along a second optical path via said interferometric arrangement, the second optical path differing from the first optical path, thereby giving rise to an optical path difference between the first and second optical paths which depends on a distance between the membrane and the at least one optical element; and
the photo detector(s) detecting at least part of an interference pattern generated by said first and second portions of light dependent on said optical path difference.

* * * * *